US 9,660,789 B2

(12) United States Patent
Nammi et al.

(10) Patent No.: US 9,660,789 B2
(45) Date of Patent: May 23, 2017

(54) CENTRAL NETWORK NODE, FIRST NETWORK NODE, FIRST WIRELESS DEVICE, CONTROLLER NETWORK NODE, AND METHODS THEREIN, OF INSTRUCTING THE FIRST NETWORK NODE TO TRANSMIT TO THE FIRST WIRELESS DEVICE

(71) Applicant: Telefonaktiebolaget L M Ericsson (publ), Stockholm (SE)

(72) Inventors: Sairamesh Nammi, Kista (SE); Bo Göransson, Sollentuna (SE); Patrik Karlsson, Sollentuna (SE); Qingyu Miao, Beijing (CN); Fredrik Ovesjö, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 14/373,806

(22) PCT Filed: Apr. 3, 2014

(86) PCT No.: PCT/SE2014/050406
§ 371 (c)(1),
(2) Date: Jul. 22, 2014

(87) PCT Pub. No.: WO2014/163570
PCT Pub. Date: Oct. 9, 2014

(65) Prior Publication Data
US 2015/0195073 A1 Jul. 9, 2015

Related U.S. Application Data

(60) Provisional application No. 61/808,309, filed on Apr. 4, 2013.

(51) Int. Cl.
*H04W 72/00* (2009.01)
*H04L 5/00* (2006.01)
(Continued)

(52) U.S. Cl.
CPC .......... *H04L 5/0057* (2013.01); *H04L 1/0026* (2013.01); *H04L 1/1671* (2013.01);
(Continued)

(58) Field of Classification Search
USPC ............................ 370/310.2, 328–333, 338; 455/432.1–453, 550.1, 552.1, 553.1,
(Continued)

(56) References Cited

U.S. PATENT DOCUMENTS

2008/0130584 A1* 6/2008 Pani .................. H04W 36/0083
370/332
2011/0261711 A1* 10/2011 Kronestedt .......... H04B 7/0608
370/252

(Continued)

FOREIGN PATENT DOCUMENTS

WO WO 2008/054775 5/2008

OTHER PUBLICATIONS

PCT Notification of Transmittal of the International Search Report and the Written Opinion of the International Searching Authority, or the Declaration for International Application No. PCT/SE2014/050406, Aug. 8, 2014.
(Continued)

*Primary Examiner* — San Htun
(74) *Attorney, Agent, or Firm* — Baker Botts, LLP

(57) ABSTRACT

A method performed by a central network node includes instructing one of a first network node and a second network node to transmit to a first wireless device. The central network node receives a first Channel Quality Indicator, CQI, and a third CQI sent by the first wireless device. The
(Continued)

first CQI has been computed by the first wireless device based on a first unique signal transmitted by the first network node. The third CQI has been computed by the first wireless device based on a second unique signal transmitted by the second network node. The central network node identifies the one of the first and the second network nodes having a better channel quality, based on the received first CQI and the third CQI. The central network node sends a first message to the identified network node, instructing it to transmit to the first wireless device.

17 Claims, 15 Drawing Sheets

(51) Int. Cl.
H04L 1/00 (2006.01)
H04W 36/08 (2009.01)
H04W 28/16 (2009.01)
H04W 72/08 (2009.01)
H04L 1/16 (2006.01)
H04W 36/00 (2009.01)
H04W 72/12 (2009.01)

(52) U.S. Cl.
CPC ........... *H04W 28/16* (2013.01); *H04W 36/08* (2013.01); *H04W 72/085* (2013.01); *H04W 36/0005* (2013.01); *H04W 72/1278* (2013.01)

(58) Field of Classification Search
USPC .............................................. 455/560–562.1
See application file for complete search history.

(56) References Cited

U.S. PATENT DOCUMENTS

| 2012/0093010 | A1* | 4/2012 | Vajapeyam | ......... H04W 52/244 |
| | | | | 370/252 |
| 2012/0155429 | A1* | 6/2012 | Lin | ................. H04W 36/0005 |
| | | | | 370/331 |
| 2012/0201164 | A1* | 8/2012 | Jongren | ................ H04L 5/0048 |
| | | | | 370/252 |
| 2012/0207105 | A1* | 8/2012 | Geirhofer | ............. H04L 5/0032 |
| | | | | 370/329 |

OTHER PUBLICATIONS

3GPP TSG RAN WG1 Meeting #72; St. Julian's, Malta; Source: Ericsson, ST-Ericsson; Title: Link Level Analysis of Spatial Reuse Mode for Combined Cell Deployments (R1-130613), Jan. 28-Feb. 1, 2013.

3GPP TSG RAN WG1 Meeting #72bis; Chicago, USA; Source: Ericsson, ST-Ericsson; Title: Analysis of Probing Pilots for Spatial Reuse Mode in Combined Cell Deployment (R1-131540), Apr. 15-Apr. 19, 2013.

3GPP TSG RAN WG1 Meeting #73; Fukuoka, Japan; Source: Ericsson, ST-Ericsson; Title: Overview of Spatial Reuse Mode in Combined Cell Deployment for HeterogeneousNetworks (R1-132603), May 20-May 24, 2014.

* cited by examiner

CENTRAL NETWORK NODE, FIRST
NETWORK NODE, FIRST WIRELESS
DEVICE, CONTROLLER NETWORK NODE,
AND METHODS THEREIN, OF
INSTRUCTING THE FIRST NETWORK
NODE TO TRANSMIT TO THE FIRST
WIRELESS DEVICE

PRIORITY

This nonprovisional application is a U.S. National Stage Filing under 35 U.S.C. §371 of International Patent Application Serial No. PCT/SE2014/050406, filed Apr. 3, 2014 and entitled "Central Network Node, First Network Node, First Wireless Device, Controller Network Node, and Methods Therein, of instructing the First Network Node to Transmit to the First Wireless Device," which claims the benefit of U.S. Provisional Application No. 61/808,309, filed Apr. 4, 2013 and entitled "Central Network Node, First Network Node, First Wireless Device, Controller Network Node, and Methods Therein, of Instructing the First Network Node to Transmit to the First Wireless Device."

TECHNICAL FIELD

The present disclosure relates generally to a central network node, and methods therein of instructing one of a first network node and a second network node to transmit to a first wireless device. The present disclosure also relates generally to the first network node and methods therein of transmitting to the first wireless device. The present disclosure also relates generally to the first wireless device and methods therein of sending Channel Quality Indicators, CQIs, to the central network node. The present disclosure also relates generally to a controller network node and methods therein of configuring the first wireless device. The present disclosure relates as well to computer programs and computer-readable storage mediums, having stored thereon the computer programs to carry out the aforementioned methods. In particular, embodiments herein relate to handling channel quality in a heterogeneous network.

BACKGROUND

Communication devices such as wireless devices are also known as e.g. User Equipments (UE), mobile terminals, wireless terminals and/or mobile stations. Wireless devices are enabled to communicate wirelessly in a wireless communications system or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications system.

Wireless devices may further be referred to as mobile telephones, cellular telephones, or laptops with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as wireless device or a server.

The wireless communications system covers a geographical area which is divided into cell areas, wherein each cell area being served by a base station e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the area of radio coverage provided by the base station at a base station site. One base station, situated on the base station site, may serve one or several cells. Further, each base station may support one or several communication technologies. The base stations communicate over the air interface operating on radio frequencies with the wireless devices within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in Global System for Mobile communications (GSM), may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. The 3GPP has undertaken to evolve further the UTRAN and GSM based radio access network technologies.

According to 3GPP GSM EDGE Radio Access Network (GERAN), a wireless device has a multi-slot class, which determines the maximum transfer rate in the uplink and downlink direction. EDGE is an abbreviation for Enhanced Data rates for GSM Evolution. In the end of 4008 the first release, Release 8, of the 3GPP Long Term Evolution (LTE) standard was finalized and later releases have also been finalized.

In the context of this disclosure, the expression Downlink (DL) is used for the transmission path from the base station to the mobile station. The expression Uplink (UL) is used for the transmission path in the opposite direction i.e. from the mobile station to the base station.

During the last few years cellular operators have started to offer mobile broadband based on WCDMA/High-Speed Packet Access (HSPA). Further, fuelled by new devices designed for data applications the end user performance requirements are steadily increasing. The large uptake of mobile broadband has resulted in heavy traffic volumes that need to be handled by the HSPA networks. Therefore, techniques that allow cellular operators to manage their spectrum resources more efficiently are desirable.

To improve the DL performance techniques such that 4-branch Multiple-Input Multiple-Output (MIMO), multi-flow communication, multi-carrier deployment may be introduced. Since improvements in spectral efficiency per link are approaching theoretical limits, the next generation technology is about improving the spectral efficiency per unit area. In other words, the additional features for High Speed Downlink Packet Access (HSDPA) may need to provide a uniform user experience to users anywhere inside a cell by changing the topology of traditional networks. Currently, 3GPP has been working on this aspect of using Heterogeneous networks, as discussed in RP-121436, Study on UMTS Heterogeneous Networks, R1-124512, Initial considerations on Heterogeneous Networks for UMTS, Ericsson, ST-Ericsson, and R1-124513, Heterogeneous Network Deployment Scenarios, Ericsson, ST-Ericsson.

Homogeneous Networks:

A homogeneous network is a network of base stations, such as Node B, in a planned layout and a collection of user terminals in which all base stations have similar transmit power levels, antenna patterns, receiver noise floors, and similar backhaul connectivity to the data network. Moreover, all base stations offer unrestricted access to user terminals in the network, and serve roughly the same number of user terminals. Current cellular wireless system comes under this category for example GSM, WCDMA, HSDPA, LTE, Wimax, etc.

Heterogeneous Networks:

In heterogeneous networks, in addition to the planned or regular placement of macro base stations, several pico/femto/relay base stations are deployed as shown in FIG. 1. FIG. 1 illustrates a typical deployment of low power nodes, or small cells 1, in a Heterogeneous Network with a macro node 2.

The power transmitted by these pico/femto/relay base stations may be relatively small compared to that of macro base stations which may be up to 2 Watts (W) as compared to that of 40 W for a macro base station. These Low Power Nodes (LPN) are deployed to eliminate coverage holes in the homogeneous networks using macro only, improving the capacity in hot-spots. Due to their lower transmit power and smaller physical size, pico/femto/relay base stations may offer flexible site acquisitions, The Low power nodes in heterogeneous networks may have a. Different cell identifier as that of macro cell, that is, different cells;

b. Same cell identifier as that of macro cell, called soft, shared, or combined cell.

Combined Cell in a Heterogeneous Network

As mentioned above, heterogeneous networks may be divided into two categories

1. Where the low power nodes have different cell identifiers (ids) than that of the macro node.

2. Whew low power nodes have same cell id as that of the macro node.

FIG. 2 shows a heterogeneous network layout with two low power nodes, a macro node. In the network of FIG. 2, the low power nodes create different cells, Cell B and Cell C, and each of the low power nodes has different cell id. The macro node creates Cell A. In the Figure, the logical cell coverage is marked with dashed and continuous lines. Simulations show that using low power nodes in a macro cell offers load balancing, with large gains in system throughout as well as cell edge user throughput.

One disadvantage of the above method is that each LPN creates a different cell, hence a UE may need to do soft handover when moving from one LPN to a macro or to another LPN. The increase in higher layer signaling which is needed to perform handovers may have a negative impact on network performance. With a large number of LPN, mobility management may become worse.

FIG. 3 shows the heterogeneous network where low power nodes are part of the macro cell. The individual cells created by each of the low power nodes and the macro node form a single cell, or the same cell, also called soft cell A. In the figure, the Common Pilot CHannel (CPICH), sometimes also referred to as P-CPICH, is represented with a dashed line. This is sometimes called a soft cell or a shared cell. This set up avoids the frequent soft handovers and, hence, lowers the requirements on higher layer signaling. The drawback with this shared cell deployment is that the capacity of the system is limited since the LPN and macro site covers the same area.

FIG. 4 shows the typical configuration of a combined cell deployment where the central controller in the combined cell takes responsibility for collecting operational statistics information of network environment measurements. The decision of which nodes to transmit to a specific UE is made by the central controller based on the information provided by the UEs, network nodes or on its own. The cooperation among various nodes may be instructed by the central controller and may be implemented in a centralized way.

SUMMARY

It is an object of embodiments herein to improve the performance in a wireless communications network by enabling or supporting identification of one of a first network node and a second network node having a better channel quality to transmit to a first wireless device.

According to a first aspect of embodiments herein, the object is achieved by a method performed by a central network node. The method is of instructing one of a first network node and a second network node to transmit to a first wireless device. The central network node, the first network node, the second network node, and the first wireless device operate in a combined cell deployment in a wireless communications network. The central network node receives a first CQI, and a third CQI sent by the first wireless device. The first CQI has been computed by the first wireless device based on a first unique signal transmitted by the first network node. The third CQI has been computed by the first wireless device based on a second unique signal transmitted by the second network node. The central network node identifies the one of the first network node and the second network node having a better channel quality to transmit to the first wireless device. This is based on the received first CQI and the third CQI. The central network node sends a first message to the identified one of the first network node and the second network node having the better channel quality, the first message instructing the identified one of the first network node and the second network node to transmit to the first wireless device.

According to a second aspect of embodiments herein, the object is achieved by a method performed by the first network node. The method is of transmitting to the first wireless device. The first network node and the first wireless device operate in the combined cell deployment in the wireless communications network. The first network node transmits the first unique signal to the first wireless device. The first unique signal enables the first wireless device to compute the first CQI based on the first unique signal. The first CQI enables the central network node operating in the combined cell deployment to identify the one of the first network node and the second network node operating in the combined cell deployment having the better channel quality to transmit to the first wireless device. The first network node receives the first message from the central network node instructing the first network node to transmit to the first wireless device.

According to a third aspect of embodiments herein, the object is achieved by a method performed by the first wireless device. The method is of sending CQIs to the central network node. The central network node and the first wireless device operate in the combined cell deployment in the wireless communications network. The first wireless device receives the first unique signal from the first network node operating in the combined cell deployment. The first wireless device receives the second unique signal from the second network node operating in the combined cell deployment. The first wireless device computes the first CQI based on the received first unique signal, and the third CQI based on the received second unique signal. The first wireless device sends the first CQI and the third CQI to the central network node.

According to a fourth aspect of embodiments herein, the object is achieved by a method performed by the controller network node. The method is of configuring the first wireless device. The first wireless device operates in the combined cell deployment in the wireless communications network. The controller network node operates in the wireless communications network. The controller network node sends a configuration message to the first wireless device. The configuration message comprises instructions for the first wireless device to compute the first CQI for a first unique channel, and to compute the third CQI for a second unique channel. The first CQI is to be computed by the first wireless device based on the first unique signal transmitted by the first network node operating in the combined cell deployment. The third CQI is to be computed by the first wireless device based on the second unique signal transmitted by the second network node.

According to a fifth aspect of embodiments herein, the object is achieved by the central network node. The central network node is configured to instruct one of the first network node and the second network node to transmit to the first wireless device. The central network node, the first network node, the second network node, and the first wireless device are configured to operate in the combined cell deployment in the wireless communications network. The central network node is configured to receive the first CQI and the third CQI sent by the first wireless device. The first CQI has been computed by the first wireless device based on the first unique signal transmitted by the first network node. The third CQI has been computed by the first wireless device based on the second unique signal transmitted by the second network node. The central network node identifies the one of the first network node and the second network node having the better channel quality to transmit to the first wireless device. This is done based on the received first CQI and the third CQI. The central network node sends the first message to the identified one of the first network node and the second network node having the better channel quality, the first message instructing the identified one of the first network node and the second network node to transmit to the first wireless device.

According to a sixth aspect of embodiments herein, the object is achieved by the first network node configured to transmit to the first wireless device. The first network node and the first wireless device are configured to operate in the combined cell deployment in the wireless communications network. The first network node is configured to transmit the first unique signal to the first wireless device. The first unique signal enables the first wireless device to compute the first CQI based on the first unique signal. The first CQI enables the central network node configured to operate in the combined cell deployment to identify the one of the first network node and a second network node configured to operate in the combined cell deployment having the better channel quality to transmit to the first wireless device. The first network node receives the first message from the central network node instructing the first network node to transmit to the first wireless device.

According to a seventh aspect of embodiments herein, the object is achieved by the first wireless device configured to send CQIs to the central network node. The central network node and the first wireless device are configured to operate in the combined cell deployment in the wireless communications network. The first wireless device is configured to receive the first unique signal from the first network node configured to operate in the combined cell deployment. The first wireless device is configured to receive the second unique signal from the second network node configured to operate in the combined cell deployment. The first wireless device is configured to compute the first CQI based on the received first unique signal, and the third CQI based on the received second unique signal. The first wireless device is also configured to send the first CQI and the third CQI to the central network node.

According to an eighth aspect of embodiments herein, the object is achieved by the controller network node. The controller network node is configured to send the message to the first wireless device. The first wireless device is configured to operate in the combined cell deployment in the wireless communications network, and the controller network node is configured to operate in the wireless communications network. The controller network node is configured to send the configuration message to the first wireless device. The configuration message comprises instructions for the first wireless device to compute the first CQI for the first unique channel. The configuration message comprises instructions for the first wireless device to compute the third CQI for the second unique channel. The first CQI is to be computed by the first wireless device based on the first unique signal transmitted by the first network node configured to operate in the combined cell deployment. The third CQI is to be computed by the first wireless device based on the second unique signal transmitted by the second network node.

According to a ninth aspect of embodiments herein, the object is achieved by a computer program, comprising instructions which, when executed on at least one processor, cause the at least one processor to carry out the method performed by the central network node.

According to a tenth aspect of embodiments herein, the object is achieved by a computer-readable storage medium, having stored thereon the computer program, comprising instructions which, when executed on at least one processor, cause the at least one processor to carry out the method performed by the central network node.

According to a eleventh aspect of embodiments herein, the object is achieved by a computer program, comprising instructions which, when executed on at least one processor, cause the at least one processor to carry out the method performed by the first network node.

According to a twelfth aspect of embodiments herein, the object is achieved by a computer-readable storage medium, having stored thereon the computer program, comprising instructions which, when executed on at least one processor, cause the at least one processor to carry out the method performed by the first network node.

According to a thirteenth aspect of embodiments herein, the object is achieved by a computer program, comprising instructions which, when executed on at least one processor, cause the at least one processor to carry out the method performed by the first wireless device.

According to an fourteenth aspect of embodiments herein, the object is achieved by a computer-readable storage medium, having stored thereon the computer program, comprising instructions which, when executed on at least one processor, cause the at least one processor to carry out the method performed by the first wireless device.

According to a fifteenth aspect of embodiments herein, the object is achieved by a computer program, comprising instructions which, when executed on at least one processor, cause the at least one processor to carry out the method performed by the controller network node.

According to an sixteenth aspect of embodiments herein, the object is achieved by a computer-readable storage medium, having stored thereon the computer program, comprising instructions which, when executed on at least one processor, cause the at least one processor to carry out the method performed by the controller network node.

By the central network node receiving the CQI and a third CQI sent by the first wireless device, which are associated with unique signals transmitted from each of the first and second network nodes, the central network node is able to identify the one of the first network node and the second network node having a better channel quality to transmit to the first wireless device, and instruct it to transmit to the first wireless device. That is, based on feedback information from the first wireless device, the central network node may decide which node is best for scheduling the first wireless device. This approach provides spatial reuse gain for the network because the same resources, e.g., time-frequency resources may be reused from nodes located in separated locations in space in the combined cell. The potential interference caused by the use of the same resources may be managed by monitoring the feedback information reported by the first wireless device, so that the first wireless device may be scheduled in the node having the best channel quality. Hence the capacity of the wireless communications network is improved at high loads.

BRIEF DESCRIPTION OF THE DRAWINGS

Examples of embodiments herein are described in more detail with reference to attached drawings in which.

DETAILED DESCRIPTION

Figure 1:
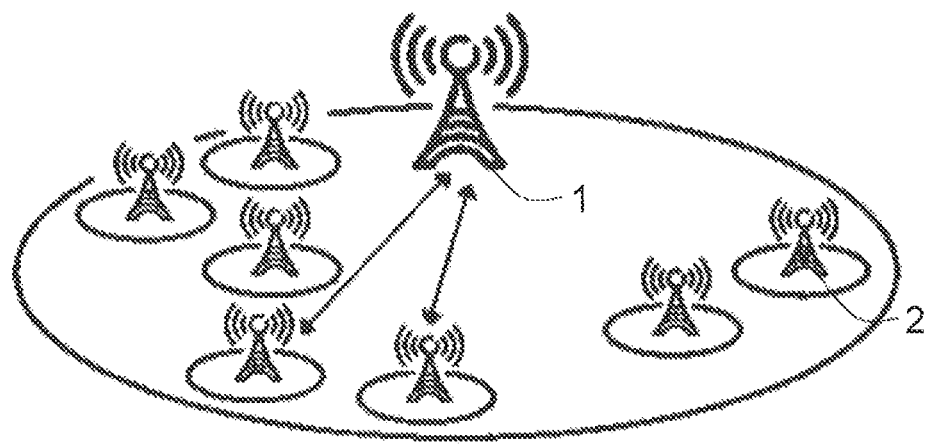
FIG. 1 is a schematic diagram illustrating a deployment of low power nodes in a Heterogeneous Network, according to prior art methods.
Figure 2:
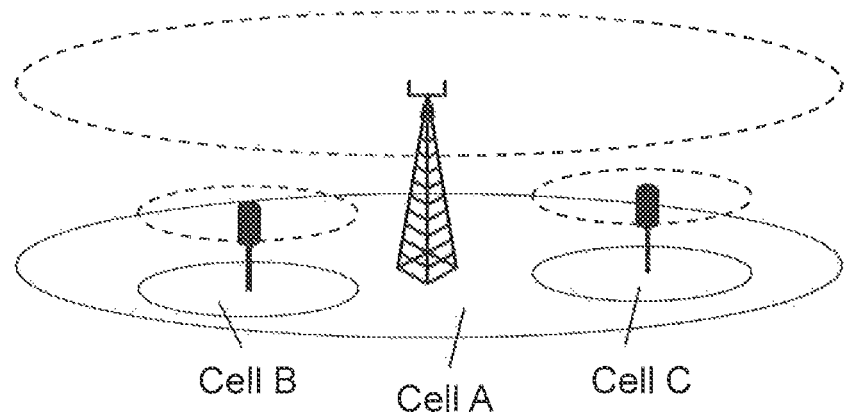
FIG. 2 is a schematic diagram illustrating Low power nodes have different cell id, according to prior art methods.
Figure 3:
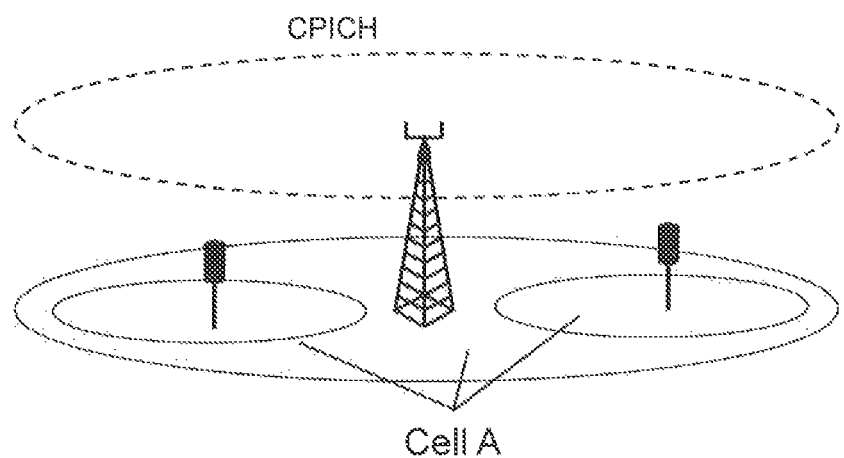
FIG. 3 is a schematic diagram illustrating Low power nodes as part of the Macro Cell, also called soft cell, according to prior art methods.

As part of the development of embodiments herein, one or more problems that may be associated with use of at least some of the prior art solutions, and that may addressed by embodiments herein, will first be identified and discussed.
Spatial Reuse Mode in Combined Cell Network One salient feature of a combined cell is that it may provide spatial reuse. In a combined, or soft, cell deployment, such as that of FIG. 1, transmitting the same signal from each node causes wastage of resources and does not provide any capacity benefits when the load of the cell is high. One method to increase the capacity of the combined cell deployment may be to reuse the resources, e.g., spreading codes, among various nodes. This is sometimes called spatial reuse because the same communication resources, such as the same time-frequency resources, are used for communication at separated locations in space, and at the same time. Spatial reuse provides for an increase in capacity of the network because a higher number of nodes may be placed in the same geographical area, and thus, a higher number of wireless devices may be served at the same time.

Figure 5:
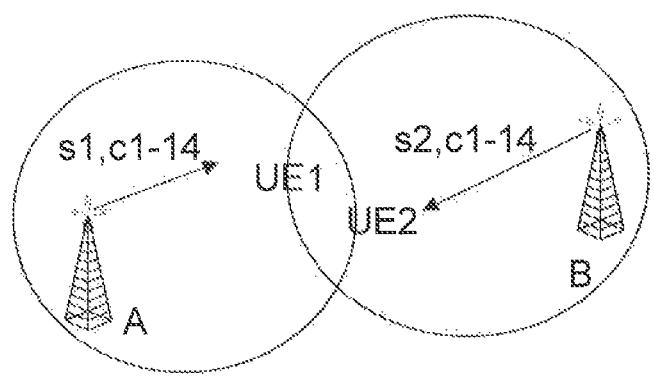
FIG. 5 is a schematic diagram illustrating Spatial Reuse in a combined cell deployment.

FIG. 5 shows a configuration of spatial reuse in a combined cell deployment between two nodes A and B. Two different data streams s1 and s2 are transmitted simultaneously on HS-PDSCH codes (c) 1-14. These two nodes have the same resources, here, the same scrambling codes and also spreading codes.

Figure 4:
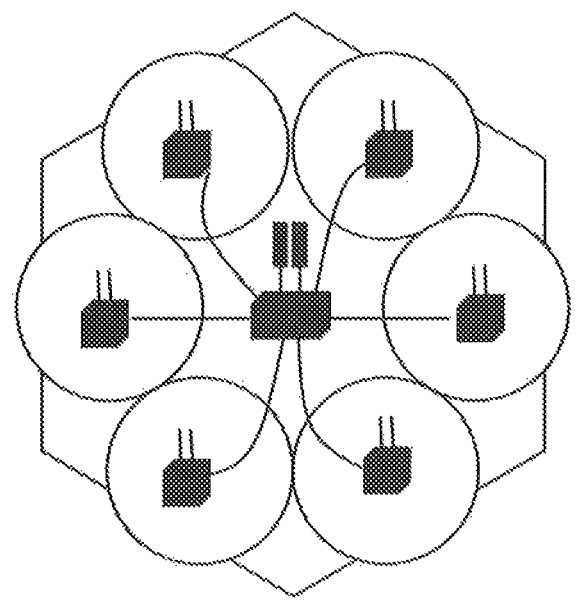
FIG. 4 is a schematic diagram illustrating typical deployment scenario of a combined cell, according to prior art methods.

For efficient implementation of spatial reuse, the central scheduler, such as the central node in FIG. 4, may need to schedule the users to the proper, respective, nodes. For example, if a user is located nearer to a node, and the data is scheduled from another node to this user, this causes wastage of resources as well as causes unnecessary interference.

Embodiments herein provide one or more methods that may compute channel quality reporting within a wireless communication system. For example, embodiments herein provide a method whereby a wireless device may compute a channel quality report and signal this information to the network, central unit, node, or controller network node. In some embodiments, the channel quality report may comprise different sets of reports with different time intervals. Embodiments are also described, wherein the central node or controller network node may use this information to schedule users, such as wireless devices, in Heterogeneous networks. In this context, scheduling may refer to transmitting data from only one or a subset of nodes as well, as assigning specific modulation, and Transport block size for that user.

Figure 6:
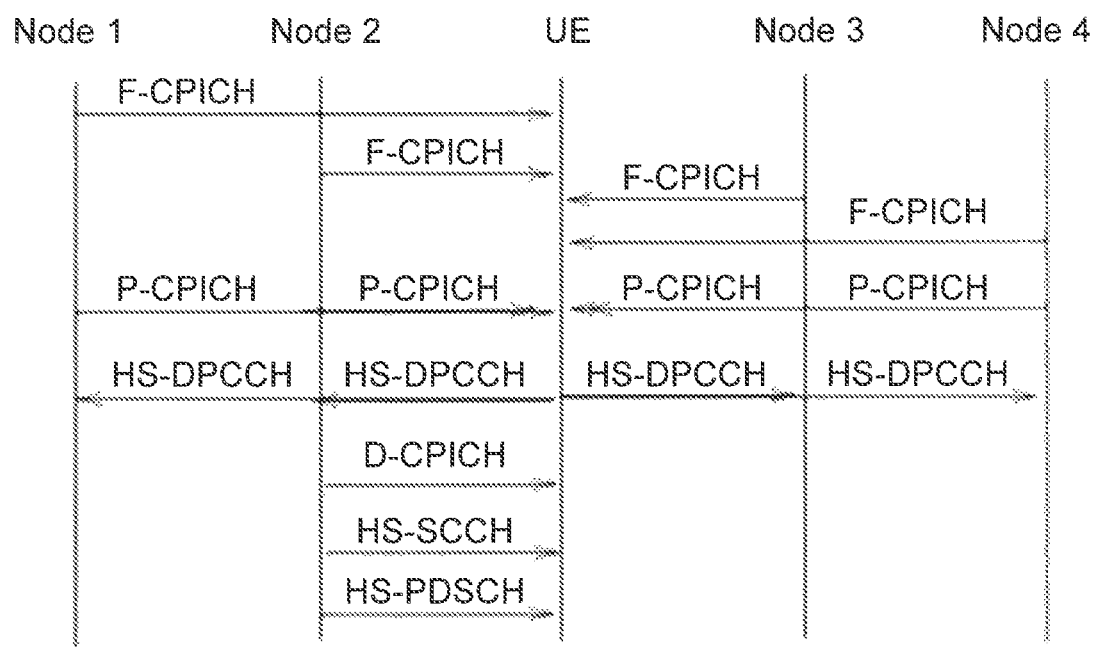
FIG. 6 is a schematic diagram illustrating embodiments of handling channel quality in a heterogeneous network in a wireless communications system.

Proposed Message Sequence Between Nodes and UE:

FIG. 6 shows a particular example of the message sequence chart between the Nodes and the UE in combined cell according to embodiments herein. In the example, a combined cell deployment consists of 4 Nodes, Node 1, Node 2, Node 3 and Node 4, and multiple UEs. The same procedure may apply if the nodes are more than 4 or less than 4. A reference signal which is unique to the combined cell called Fractional Common Pilot CHannel (F-CPICH) may be transmitted from each node. Only one F-CPICH may be transmitted from any node at any given instance, such as time instance or time unit, e.g., a sub-frame. A pre-defined sequence which may be known to the UE is transmitted over the entire combined cell, but transmitted from each node for certain durations. The F-CPICH is characterized by a spreading code, typically Spreading Factor (SF)=256, and a scrambling code which may be either a primary scrambling code or a secondary scrambling code of the combined cell. The F-CPICH channel power may need to be indicated to the UE during the initial cell set up. In addition to F-CPICH, a primary common pilot Primary Common Pilot Channel (P-CPICH) which is common to all the nodes may be continuously transmitted. From these two different pilot signals, the UE may estimate the channel and then feedback the CQI for these two pilots at two time intervals. The CQI estimated with F-CPICH indicates the channel quality that corresponds to the specific node and is hereafter referred to as $CQI_F$. The CQI computed using P-CPICH is the channel quality using all the nodes in the combined cell. It is the conventional channel quality indicator, and it may be used for scheduling the UE. Hereafter this is referred to as $CQI_P$. These two CQIs may be time multiplexed and sent on the UL feedback channel High Speed Dedicated Physical Control Channel (HS-DPCCH) as described in next subsection. The same HS-DPCCH signal may be received by all the Nodes in the coverage area of the UE. The central processing unit may process the received signal, e.g., HS-DPCCH, from all the nodes. From $CQI_F$ the central scheduler may identify which node a particular UE has the "best" channel quality with. Hence, the scheduler may inform the respective node to transmit to the UE. The assigned node may transmit the demodulation pilots, such as the Demodulation Common Pilot Channel (D-CPICH), downlink control channel, such as the High Speed-Shared Control Channel (HS-SCCH) and the downlink traffic channel, such as the High-Speed Physical Downlink Shared Channel (HS-PDSCH) to the respective UE. Similarly, the central scheduler may inform the other nodes to transmit to the other UEs.

Figure 7:
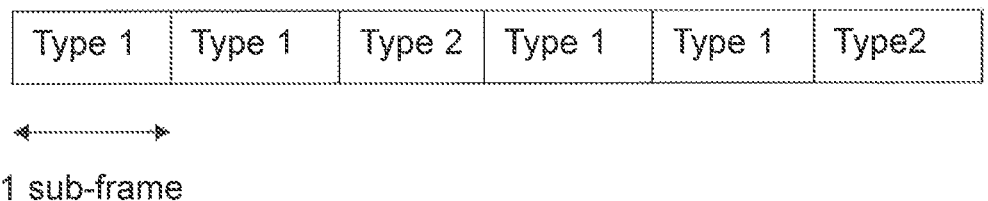
FIG. 7 is a schematic diagram illustrating embodiments of a HS-DPCCH structure.
Figure 8A:
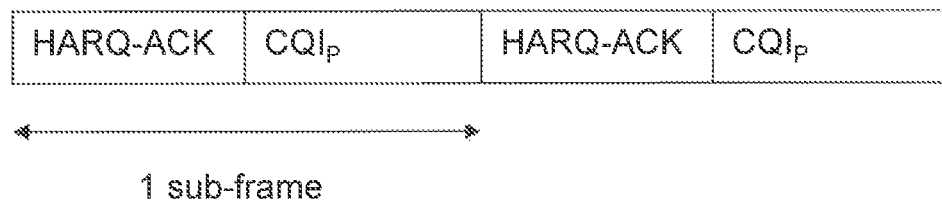
FIG. 8a is a schematic diagram illustrating embodiments of Type 1 information.
Figure 8B:
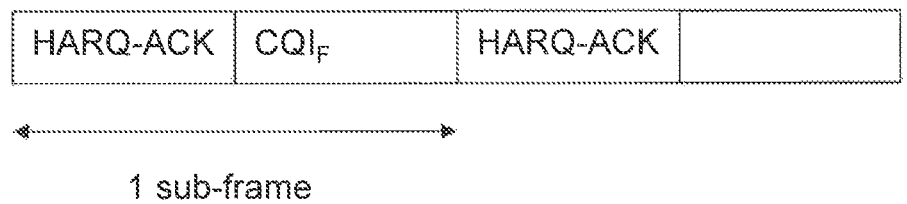
FIG. 8b is a schematic diagram illustrating embodiments of Type 2 information.

HS-DPCCH Structure:

FIG. 7 shows the HS-DPCCH structure provided herein for a combined cell where two types of reporting may be defined herein, Type 1 and Type 2 reporting. In Type 1 reporting the UE may compute the Cap based on common pilots and in Type 2 the UE may compute the $CQI_F$ based on probing, or fractional, pilots. FIGS. 8a and 8b show the Type 1 report and Type 2 reports respectively. Type 1 information may comprise Hybrid Automatic Repeat reQuest ACKnowledgement (HARQ-ACK) information in one slot and CQI information computed through P-CPICH in the 2 remaining slots. Similarly, Type 2 report may comprise HARQ-ACK in the first slot and CQI computed through individual probing pilots for the last 2 slots. How often the UE may report Type 1 and Type 2 may be conveyed to the UE through Radio Resource Control (RRC) signaling. In another embodiment, the central node may recommend these values to e.g., the RNC, and RNC may send these parameters through RRC signaling.

For example, the RNC may set the value of Type 1 to Type 2 ratio as 1/10. In this case, out of 10 reports, 1 report is Type 2 and 9 reports are of Type 1. In Type 2 reporting, the $CQI_F$ may correspond to only F-CPICH at any time. Hence, based on the number of nodes, the frequency of individual node reporting may be different. i.e. if there are only 2 nodes, then the frequency of reporting of each node may be faster.

Computation of $CQI_F$:

For computation of $CQI_F$, the network may inform how many subframes the UE is allowed to average the CQI over. For example, the network may recommend, M=10 subframes, then the UE may measure the channel quality over 10 subframes and may report in the 11th subframe. In one embodiment, the UE may use mapping tables, such as quantized Signal to Interference plus Noise Ratio (SINR), to calculate this information. The value M may be configurable and may be chosen by the RNC on its own, or alternatively the value may be recommended by the node to the RNC. The RNC then may send this configuration parameter through RRC signaling to the UEs.

At the transmission side, there may be one F-CPICH from a particular node. The node may need to transmit for at least M subframe, so that a UE may calculate and transmit the Type 2 report.

Scheduling of UE:

Based on feedback information from the UE, the central node may decide which node is "best" for scheduling that particular UE. Once the node is determined for transmission; modulation, transport block size and the number of spreading codes may be selected for DL transmission. As the $CQI_P$ may cover small scale variations in the combined channel, and $CQI_F$ may cover the long term statistics of the channel, the CQI for the selected node may be a function of both $CQI_P$ and $CQI_F$.

Simulation Results

Figure 9:
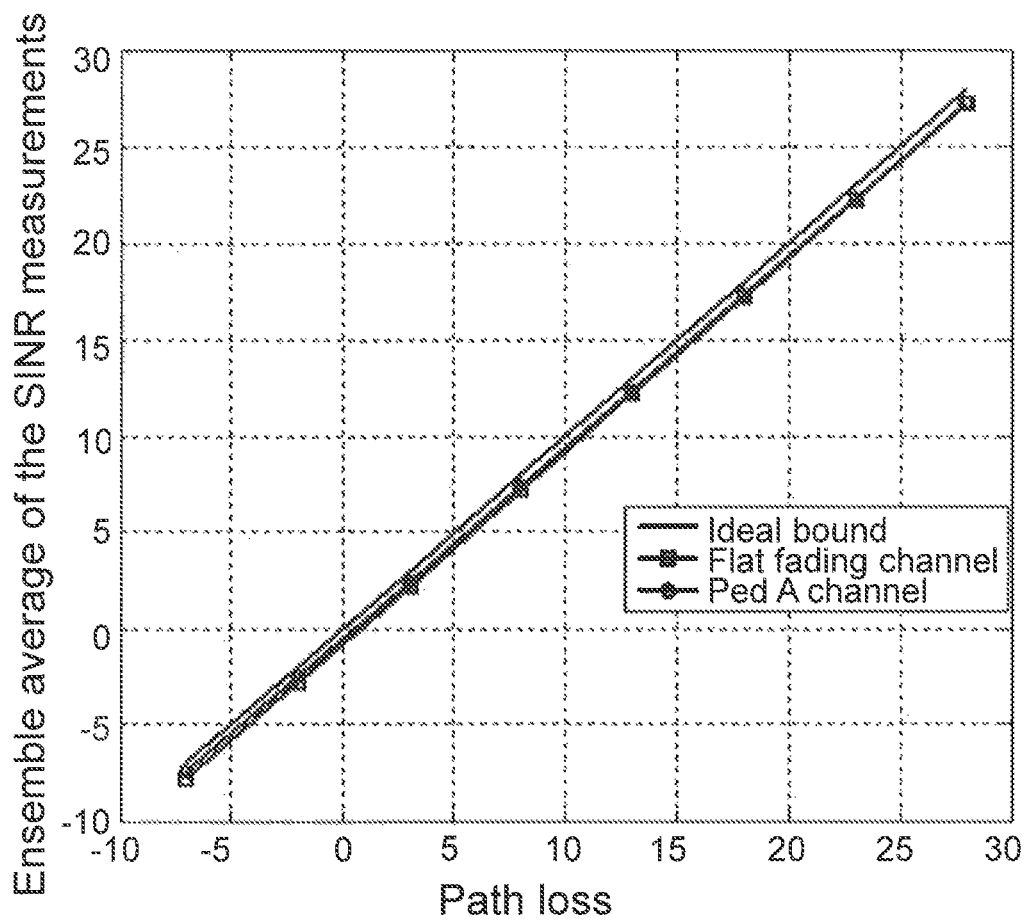
FIG. 9 is a diagram illustrating embodiments of simulation data.

A CQI may be a function of path loss. FIG. 9 below shows the simulation result of estimating the path loss, where the UE reports Type 2 CQI are averaged over 10 sub frames. The mean SINR is plotted for different geometries, that is, different functions of Signal to Noise Ratio. It may be seen that for both a flat fading channel and a Pedestrian Channel A (Ped A) channel, the curves are almost reaching ideal estimation. That is, Type 2 CQI reports on two different channels provide feedback information that closely matches the quality of the channel, according to ideal estimation.

Embodiments of the methods herein, as for example, described above in a particular example, will now be further described. Any of the details already provided apply to the following description.

Figure 10:
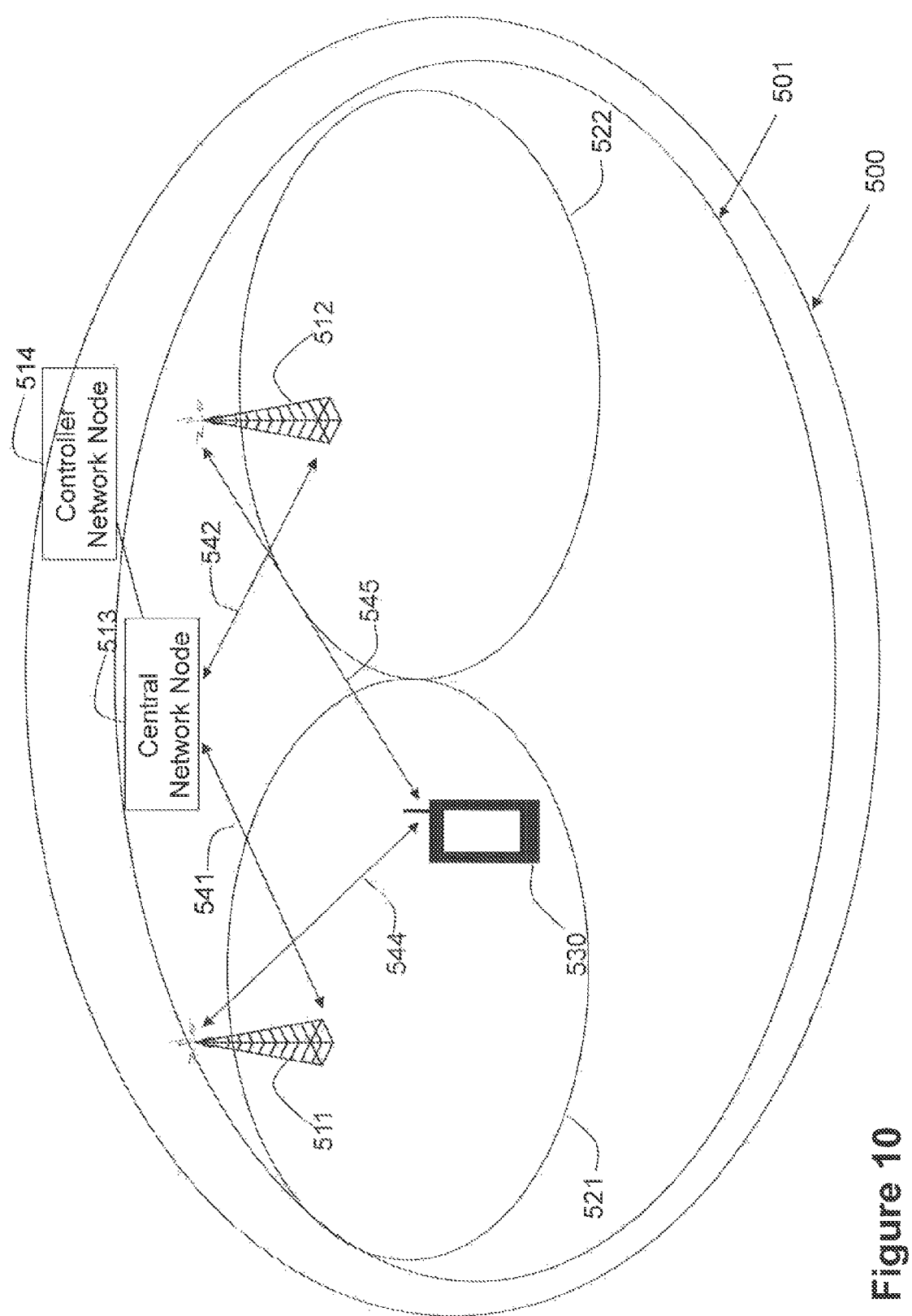
FIG. 10 is a schematic diagram illustrating embodiments of a wireless communications network.

FIG. 10 depicts a wireless communications network 500 in which embodiments herein may be implemented. The wireless communications network 500 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), WCDMA, Universal Terrestrial Radio Access (UTRA) TDD, Universal Mobile Telecommunications System (UMTS), High-Speed Packet Access (HSPA) network, GSM network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Worldwide Interoperability for Microwave Access (WiMax), or any cellular network or system.

Wireless communications network 500 comprises a combined cell deployment 501, as described above.

The combined cell deployment 501 comprises a first network node 511, a second network node 512, and a central network node 513. Each of the first network node 511 and the second network node 512 may be, for example, Low Power Nodes (LPN) such as pico/femto/relay base stations. The power transmitted by each of these pico/femto/relay base stations is relatively small compared to that of macro base stations, which may be up to 2 W as compared to that of 40 W for macro base station. These LPN are deployed to eliminate coverage holes in the homogeneous networks (using macro only), improving the capacity in hot-spots. Due to their lower transmit power and smaller physical size, pico/femto/relay base stations may offer flexible site acquisitions. In other examples, each of the first network node 511 and the second network node 512 may be a macro base station. In some examples, each of the first network node 511 and the second network node 512 may be the central network node 513.

The central network node 513 may be, for example, a macro scheduling unit similar to current main units in main/remote Base Station (BS) implementations. Thus, the central network node 513 may serve the combined cell deployment 501. The base stations may be such as e.g. a Node B, eNB, or eNodeB or any other network unit capable to serve a device or a machine type communication device in a wireless communications network 500.

The wireless communications network 500 covers a geographical area which is divided into cell areas, wherein each cell area is served by a network node. In some particular embodiments, one network node may serve one or several cells. In the case of a combined cell deployment, such as combined cell deployment 501, each cell area is served by a central network node and its associated network nodes. In the example depicted in FIG. 10, the first network node 511 serves a first area 521, and the second network node 512 serves a second area 522. Typically, wireless communications network 500 may comprise more areas similar to 521 and 522, served by their respective network nodes, and more cells such as combined cell deployment 501. This is not depicted in FIG. 10 for the sake of simplicity. Each of the first network node 511, the second network node 512, and the central network node 513 may support one or several communication technologies, and its name may depend on the technology and terminology used. In 3GPP LTE, central network node 513, which may be referred to as eNodeBs or even eNBs, may be directly connected to one or more core networks.

The wireless communications network 500 comprises a controller network node 514. Controller network node 514 controls the use of radio resources of at least one network node, such as central network node 513. The controller network node 514 may also control in some embodiments, the integrity of such radio resources. In some particular embodiments, the controller network node 513 may be, for example, a Radio Network Controller (RNC).

A number of wireless devices are located in the wireless communications network 500. In the example scenario of FIG. 10, only one wireless device is shown, wireless device 530. The wireless device 530 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network. The wireless device 530 may further be referred to as a mobile telephone, cellular telephone, or laptop with wireless capability, just to mention some further examples. The wireless device 530 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

The first network node 511 may e.g. communicate with the central network node 513 over a link 541, whereas the second network node 512 may communicate with the central network node 513 over a link 542.

The wireless device 530 may e.g. communicate with the first radio node 511 over a radio link 544, and it may communicate with the second radio node 512 over a radio link 545.

The central network node 513 may be connected to the controller network node 514.

Embodiments herein may comprise channel quality reporting for scheduling users in heterogeneous networks.

Figure 11:
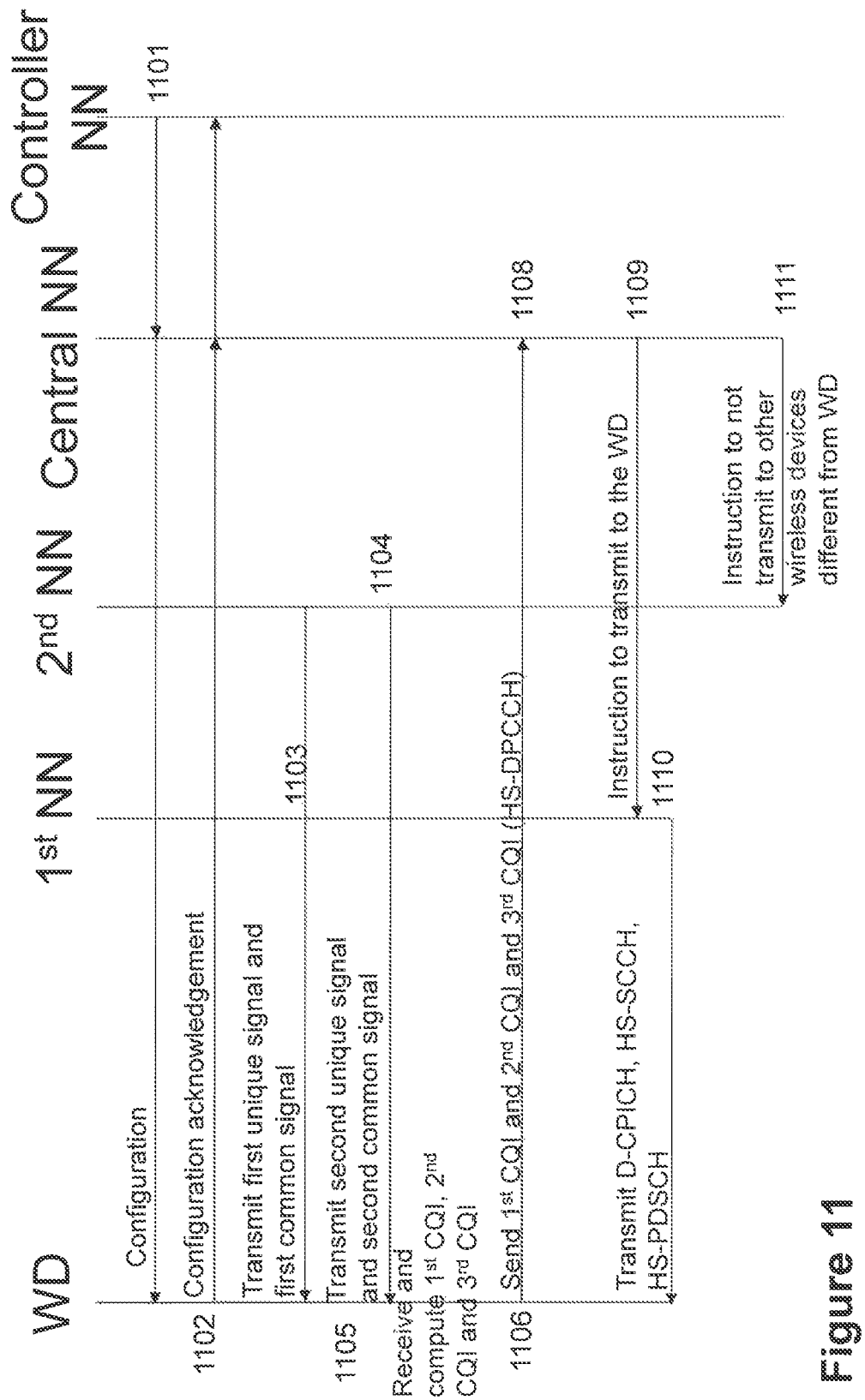
FIG. 11 is a schematic diagram illustrating embodiments of a method in a wireless communications network for handling channel quality in a heterogeneous network.

Embodiments of a method in the wireless communications network 500 for handling channel quality in a heterogeneous network will now be described with reference to the schematic diagram depicted in FIG. 11. FIG. 11 is a summarized schematic diagram of an example of the communications that may occur in embodiments herein, between wireless device 530, depicted in the Figure as WD, the first network node 511, depicted in the Figure as $1^{st}$ NN, the second network node 512, depicted in the Figure as $2^{nd}$ NN, the central network node 513, depicted in the Figure as Central NN, and the controller network node 514, depicted in the Figure as Controller NN.

The method may comprise the following actions, which actions may as well be carried out in another suitable order than that described below. In some embodiments, all the actions may be carried out, whereas in other embodiments only some action/s may be carried out.

Action 1101

As depicted in FIG. 11, the controller network node 514 may send a configuration message to the wireless device 530. The configuration message may comprise instructions for the wireless device 530 to compute a first Channel Quality Indicator (CQI) for a first unique channel, to compute a second CQI for a first common channel, and to compute a third CQI for a second unique channel, as described below.

In some particular embodiments, this configuration message may be an RRC message.

In some embodiments, the instructions comprised in the configuration message sent by the controller network node 514 may be based on a recommendation by one of: the first network node 511, the second network node 512 and the central network node 513.

In some particular embodiments, the controller network node 514 is a Radio Network Controller (RNC).

In some embodiments, the configuration message may comprise a number M of subframes over which the wireless device 530 may measure and average over, channel quality, as described below.

Action 1102

In some embodiments, the wireless device 530 receives the configuration message sent by the controller network node 514. In some embodiments this may be done, for example, through the central network node 513, or through one of the first network node 511 and the second network node 512. In some particular embodiments, the wireless device 530 acknowledges having received the configuration message sent by the controller network node 514 by sending an acknowledgement message to the controller network node 514. In some embodiments this may be done, for example, through the central network node 513, or through one of the first network node 511 and the second network node 512. In some particular embodiments, the acknowledgement message sent by the wireless device 530 to acknowledge having received the configuration message from the controller network node 514 is an RRC message comprising a reconfiguration acknowledgement.

Action 1103

In some embodiments, the first network node 511 may transmit a first unique signal and a first common signal.

In some particular embodiments, the first unique signal is a reference signal, which is unique to the combined cell deployment 501. In some further particular embodiments, the reference signal is a Fractional Common Pilot CHannel (F-CPICH). In some of these embodiments, the F-CPICH is characterized by a spreading code (typically SF=256), and a scrambling code, which is either primary scrambling code or a secondary scrambling code of the combined cell deployment 501. In some embodiments, a F-CPICH channel power may be indicated to the wireless device 530 during the initial cell set up.

In some embodiments, the first unique signal is a predefined sequence, which is known to the wireless device 530, and which is transmitted over the entire combined cell deployment 501, but transmitted from the first network node 511 for certain durations.

The first common signal may be a signal common to all the network nodes in the combined cell deployment 501. In some embodiments, the first common signal is continuously transmitted.

In some particular embodiments, the first common signal is a Primary Common Pilot CHannel (P-CPICH).

Action 1104

In some embodiments, the second network node 512 may transmit a second unique signal and a second common signal, wherein the second common signal is the same as the first common signal.

The second unique signal and the second common signal, may have the same properties as described above for the first unique signal and the first common signal, but are transmitted by the second network node 512, and will thus not be repeated here.

In some embodiments, and as depicted in FIG. 6, the first unique signal and the second unique signal may be transmitted at different time points, whereas the first common signal and the second common signal may be transmitted at the same time.

Action 1105

In some embodiments, the wireless device 530 may receive the first unique signal and the first common signal from the first network node 511, and the second unique signal and the second common signal from the second network node 512.

In these embodiments, the wireless device 530 computes the first CQI based on the received first unique signal, computes the second CQI based on the received first common signal and the second common signal, and computes the third CQI based on the second unique signal. In some of these embodiments, the wireless device 530 computes the first CQI for a first unique channel, based on the received first unique signal, computes the second CQI for a first common channel and a second common channel, based on the received first common signal and the second common signal, and computes the third CQI for a second unique channel, based on the second unique signal. In some embodiments, this may be referred to as computing channel quality reporting with mixed pilots.

In some embodiments, these computations are performed pursuant to the instructions comprised in the configuration message received from the central network node 513.

In some embodiments, computing comprises estimating the first unique channel corresponding to the first unique signal, estimating the second unique channel, corresponding to the second unique signal, estimating the first common channel corresponding to the first common signal, and estimating the second common channel corresponding to the second common signal.

The first CQI may indicate that the channel quality corresponds to the first network node 511, whereas the third may CQI indicate that the channel quality corresponds to the second network node 512. In some particular embodiments, the first CQI may be referred to as $CQI_{F1}$, and the third CQI may be referred to as the $CQI_{F2}$.

In some embodiments, the second CQI corresponds to the channel quality of all the nodes in the combined cell deployment 501. In some particular embodiments, the second CQI may be referred to as $CQI_P$.

In some embodiments, the wireless device 530 may measure channel quality for each of the first unique channel, the second unique channel, the first common channel, and the second common channel.

In some embodiments, computing may comprise using mapping tables, wherein the mapping tables comprise quantized SINR.

Action 1106

In some embodiments, the wireless device 530 may send the first CQI and the second CQI to the first network node 511, and send the second CQI and the third CQI to the second network node 512. In some particular embodiments, this may happen at two time intervals.

In some embodiments, the first CQI and the second CQI are time multiplexed. In some embodiments, the third CQI and the second CQI are time multiplexed.

In some particular embodiments, sending the second CQI may be referred to Type 1 reporting, whereas sending the first or the second CQI may be referred to as Type 2 reporting.

In some particular embodiments, the sending is performed on a HS-DPCCH. For some of these embodiments, FIG. 7 shows the structure of the HS-DPCCH disclosed herein, whereas FIGS. 8a and 8b show, respectively, the structure of the information in the Type 1 reporting, and the structure of the information in the Type 2 reporting.

In some embodiments, the same HS-DPCCH signal is received by all the network nodes in the coverage area of the wireless device 530, such as the first network node 511 and the second network node 512.

In some particular embodiments, Type 1 information consists of feedback information, e.g., HARQ-ACK information, in at least one slot and CQI information computed through the first common signal and the second common signal, e.g., P-CPICH, in at least one slot. In some particular embodiments, Type 1 information consists of feedback information, e.g., HARQ-ACK information, in two slots and CQI information computed through the first common signal and the second common signal, e.g., P-CPICH, in the 2 remaining slots. Similarly, in some particular embodiments. Type 2 report consists of feedback information, e.g., HARQ-ACK information in the first slot and CQI computed through individual probing pilots such as the first unique signal and the second unique signal for the second slot. In some particular embodiments, Type 2 report consists of feedback information, e.g., HARQ-ACK information in two slots and CQI computed through individual probing pilots such as the first unique signal and the second unique signal, in two slots. How often the wireless device 530 may report Type 1 and Type 2 information may be conveyed to the wireless device 530 in some embodiments through configuration signaling, such as the configuration message described in action 1101, e.g., through RRC signaling. In other embodiment, the central network node 513 may recommend these values to the controller network node 514, and the controller network node 514 may send these parameters through RRC signaling to the wireless device 530.

For example, the controller network node 514 may set the value of Type 1 to Type 2 ratio as 1/10, in this case, out of 10 reports, 1 report is Type 2 and 9 reports are of Type 1. In Type 2 reporting, the first CQI and the third CQI correspond to only F-CPICH at any time. Hence, based on the number of network nodes in the combined cell deployment 501, the frequency of individual node reporting is different. That is, if there are only 2 network nodes such as in the example shown in FIGS. 10 and 11, then the frequency of reporting of each network node is faster.

In some embodiments, the first network node 511 and the second network node 512 may need to transmit for at least a number M of timing units, e.g., subframes, so that the wireless device 530 may calculate and transmit the Type 2 report.

Action 1107

In some embodiments, the primary network node 511 receives the first CQI and the second CQI sent by the wireless device 530 in action 1106. Similarly, the second network node 512 may receive the second CQI and the third CQI sent by the wireless device 530 in action 1106.

In this action, the first network node 511 may then send the first CQI and the second CQI to the central network node 513. The second network node 512 may send the second CQI and the third CQI to the central network node 513. In some particular embodiments the first CQI and the second CQI, as well as the second CQI and the third CQI may be sent, respectively, by a HS-DPCCH.

Action 1108

In some embodiments, the central network node 513 receives in this action, the first CQI and second CQI sent by the first network node 511 in action 1107, and the second CQI and the third CQI sent by the second network node 512 in action 1107.

The central network node 513 may then process the received first CQI, second CQI and third CQI, identifying the one of the first network node 511 and the second node 512 having a better channel quality. The identifying of the one of the first network node 511 and the second node 512 having a better channel quality is done based on the first CQI and the third CQI, i.e., the $CQI_{F1}$, and the $CQI_{F2}$. In the example depicted in FIG. 11, and for illustrative purposes only, the network node having the better channel quality is the first network node 511.

As an example, in some embodiments, the node which may be considered to have better channel quality may be the node for which the one of the first CQI and the third CQI, reported from the wireless device 530, indicates a channel with a highest quality or a sufficient quality. A sufficient quality may consider for example required bit rate, such as Guaranteed Bit Rate (GBR), and status of send buffers of the respective nodes may be also taken into account.

In some embodiments, once the one of the first network node 511 and the second node 512 having a better channel quality is identified for transmission, modulation, transport block size and the number of spreading codes may be selected for downlink transmission.

In some embodiments, the CQI of the identified network node in this action, which in the illustrated example is the first network node 511, is considered to be a function of the first CQI and the second CQI, i.e., $CQI_F$ and $CQI_P$.

Action 1109

In some embodiments, the central network node 513, may send a first message to the identified one of the first network node 511 and the second node 512 having a better channel quality, and instruct it to transmit to the wireless device 530. In the example depicted in FIG. 11, and for illustrative purposes only, the network node having the better channel quality is the first network node 511.

Action 1110

In some embodiments, the identified one of the first network node 511 and the second node 512 having a better channel quality, may transmit to the wireless device 530, based to the instruction received from the central network node 513.

In some particular embodiments, the transmission in this action may comprise at least one of: demodulation pilots, such as D-CPICH, downlink control channel, such as HS-SCCH, and the downlink traffic channel, such as HS-PDSCH.

Action 1111

In some embodiments, the central network node 513 may send a second message to the one of the first network node 511 and the second node 512, which is not the network node identified in action 1108 as having a better channel quality, and instruct it to transmit a wireless device in the wireless communications network 500, which is not the wireless device 530 (not depicted in FIG. 10 or 11). In the example depicted in FIG. 10, and for illustrative purposes only, the network node not having the better channel quality is the second network node 512.

The design options outlined herein provide spatial reuse gain for the network, hence capacity may be improved at high loads.

In the embodiments herein, the first common signal and the second common signal may also be referred to herein as a/the common signal.

Embodiments of a method performed by the central network node 513 of instructing one of the first network node 511 and the second network node 512 to transmit to the first wireless device 530, will now be described with reference to the flowchart depicted in FIG. 12. As stated earlier the central network node 513, the first network node 511, the second network node 512, and the first wireless device 530 operate in the combined cell deployment 501 in the wireless communications network 500.

Figure 12:
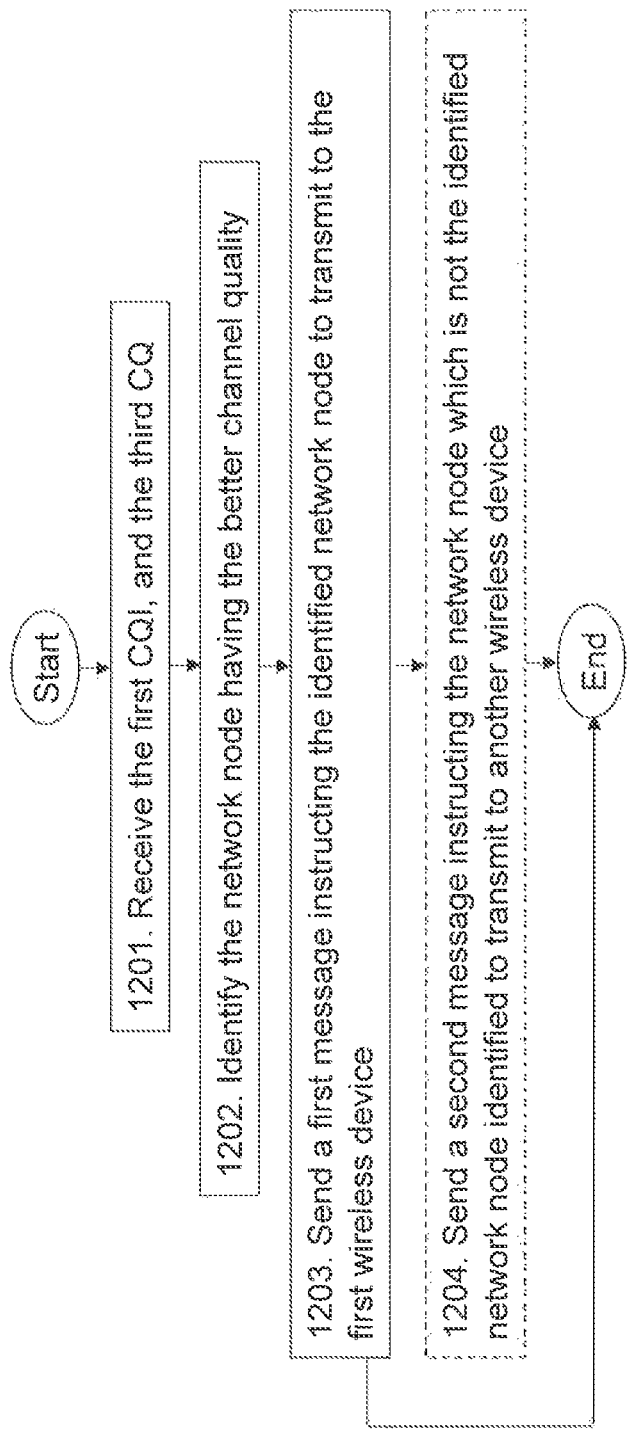
FIG. 12 is a schematic diagram illustrating embodiments of a method in a central network node, according to embodiments herein.

FIG. 12 depicts a flowchart of the actions that are or may be performed by the central network node 513 in embodiments herein. In the Figure, a box with dashed lines indicates that the action is optional.

Further details on the actions described for the central network node 513 may be found in the description of the corresponding action in FIG. 11, as indicated below. These further details are not repeated here for the sake of simplicity, but are equally applicable to the actions described in FIG. 12.

The method of instructing may comprise the following actions, which actions may as well be carried out in another suitable order than that described below. In some embodiments, all the actions may be carried out, whereas in other embodiments only some action/s may be carried out.

Action 1201

This action corresponds to action 1108. The central network node 513 receives the first CQI, and the third CQI sent by the first wireless device 530. The first CQI has been computed by the first wireless device 530 based on the first unique signal transmitted by the first network node 511. The third CQI has been computed by the first wireless device 530 based on the second unique signal transmitted by the second network node 512.

In some embodiments, the receiving may further comprise receiving the second CQI sent by the first wireless device 530. The second CQI has been computed by the first wireless device 530 based on the common signal transmitted by the first network node 511 and the second network node 512.

In some embodiments, each of the first unique signal and the third unique signal may be the Fractional Common Pilot Channel. In some embodiments, the common signal may be the Primary Common Pilot Channel.

Action 1202

This action corresponds to action 1108. The central network node 513 identifies the one of the first network node 511 and the second network node 512 having a better channel quality to transmit to the first wireless device 530, based on the received first CQI and the third CQI.

In some embodiments, the identifying may be further based on the received second CQI.

Action 1203

This action corresponds to action 1109. The central network node 513 sends the first message to the identified one of the first network node 511 and the second network node 512 having the better channel quality. The first message instructs the identified one of the first network node 511 and the second network node 512 to transmit to the first wireless device 530.

Action 1204

This action corresponds to action 1111 and it is optional. The central network node 513 may send the second message to the one of the first network node 511 and the second network node 512, which is not the network node identified as having a better channel quality. The second message may instruct the one of the first network node 511 and the second network node 512 which is not the network node identified, to transmit to another wireless device in the combined cell deployment 501, which is not the first wireless device 530.

Embodiments of a method performed by a first network node 511 of transmitting to a first wireless device 530, will now be described with reference to the flowchart depicted in FIG. 13. As stated earlier, the first network node 511 and the first wireless device 530 operate in the combined cell deployment 501 in the wireless communications network 500.

Figure 13:
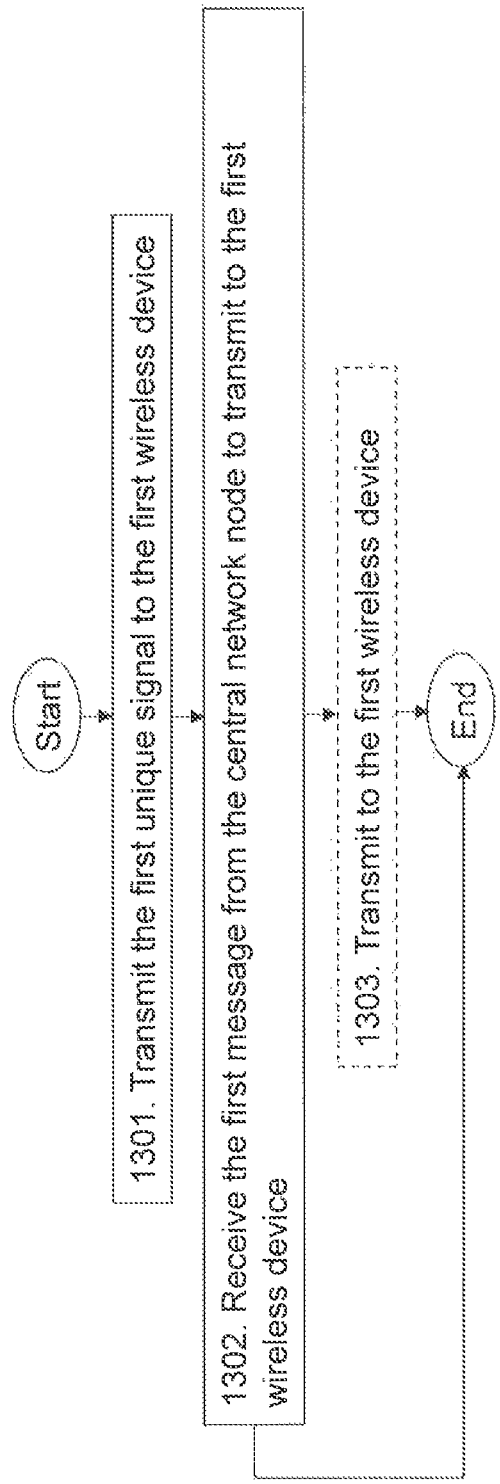
FIG. 13 is a schematic diagram illustrating embodiments of a method in a first network node, according to embodiments herein.

FIG. 13 depicts a flowchart of the actions that are or may be performed by the first network node 511 in embodiments herein. In the Figure, a box with dashed lines indicates that the action is optional.

Further details on the actions described for the first network node 511 may be found in the description of the corresponding action in FIG. 11, as indicated below. These further details are not repeated here for the sake of simplicity, but are equally applicable to the actions described in FIG. 13.

The method of instructing may comprise the following actions, which actions may as well be carried out in another suitable order than that described below. In some embodiments, all the actions may be carried out, whereas in other embodiments only some action/s may be carried out.

Action 1301

This action corresponds to action 1103. The first network node 511 transmits the first unique signal to the first wireless device 530. The first unique signal enables the first wireless device 530 to compute the first CQI, based on the first unique signal. The first CQI enables the central network node 513, which operates in the combined cell deployment 501, to identify the one of the first network node 511 and the second network node 512 operating in the combined cell deployment 501 having a better channel quality to transmit to the first wireless device 530.

In some embodiments, the transmitting may further comprise transmitting the common signal to the first wireless device 530. The common signal enables the first wireless device 530 to compute the second CQI. The second CQI further enables the central network node 513 to identify the one of the first network node and the second network node 512 having the better channel quality to transmit to the first wireless device 530.

In some embodiments, the first unique signal may be the Fractional Common Pilot Channel. In some embodiments, the common signal may be the Primary Common Pilot Channel.

Action 1302

This action corresponds to action 1109. The first network node 511 receives the first message from the central network node 513 instructing the first network node 511 to transmit to the first wireless device 530. This action applies to the embodiments wherein the first network node 511 is the one of the first network node 511 and the second network node 512 having the better channel quality to transmit to the first wireless device 530.

Action 1303

This action corresponds to action 1110 and it is optional. The central network node 513 may transmit to the first wireless device 530, based to the instruction received from the central network node 513.

Embodiments of a method performed by the first wireless device 530 of sending CQIs to the central network node 513, will now be described with reference to the flowchart depicted in FIG. 14. As stated earlier the central network node 513 and the first wireless device 530 operate in the combined cell deployment 501 in a wireless communications network 500.

Figure 14:
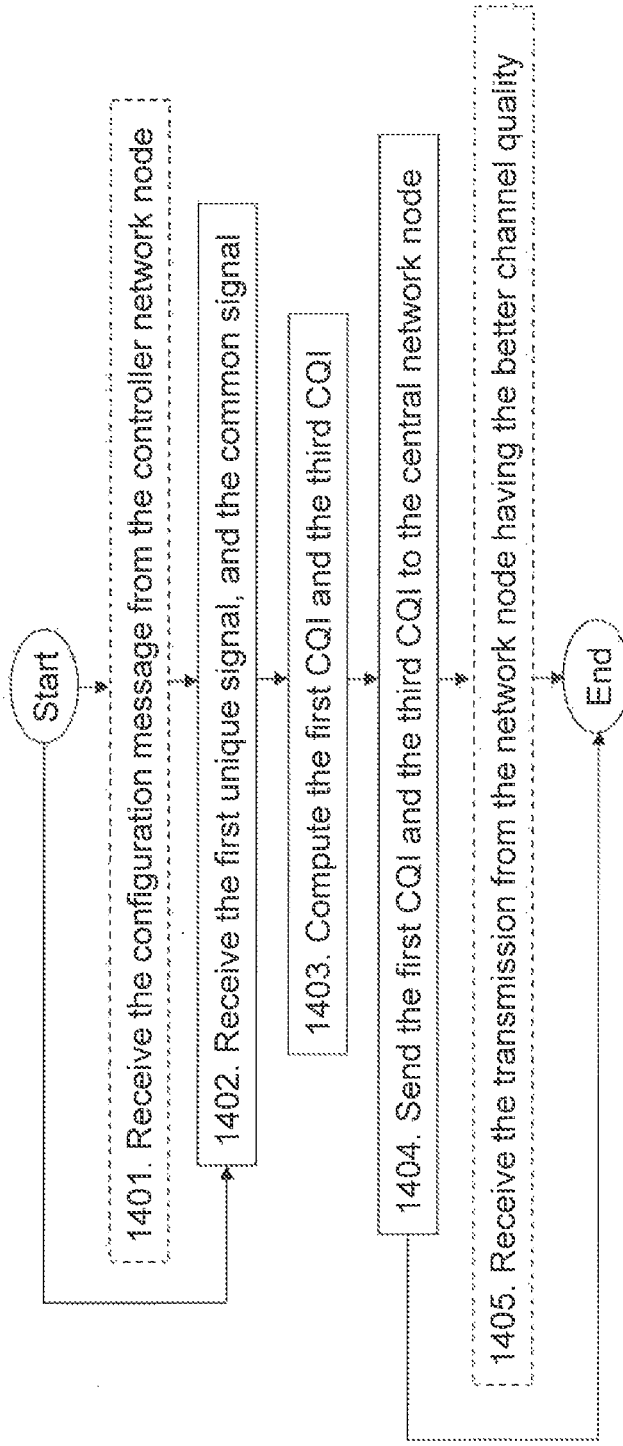
FIG. 14 is a schematic block diagram illustrating embodiments of a method in a first wireless device, according to embodiments herein.

FIG. 14 depicts a flowchart of the actions that are or may be performed by the first wireless device 530 in embodiments herein. In the Figure, a box with dashed lines indicates that the action is optional.

Further details on the actions described for the first wireless device 530 may be found in the description of the corresponding action in FIG. 11, as indicated below. These further details are not repeated here for the sake of simplicity, but are equally applicable to the actions described in FIG. 14.

The method of instructing may comprise the following actions, which actions may as well be carried out in another suitable order than that described below. In some embodiments, all the actions may be carried out, whereas in other embodiments only some action/s may be carried out.

Action 1401

This action corresponds to action 1102 and it is optional. The first wireless device 530 may receive the configuration message from the controller network node 514 operating in the wireless communications network 500, the configuration message comprising instructions for the first wireless device 530 to compute the first CQI, and the third CQI.

In some embodiments, the configuration message may further comprise instructions for the first wireless device 530 to compute the second CQI.

The configuration message is further described below under Action 1501.

Action 1402

This action corresponds to action 1105. The first wireless device 530 receives the first unique signal from the first network node 511 operating in the combined cell deployment 501, and the second unique signal from the second network node 512 operating in the combined cell deployment 501.

In some embodiments, the first wireless device 530 may further receive the common signal from the first network node 511 and the second network node 512.

In some embodiments, each of the first unique signal and the third unique signals may be the Fractional Common Pilot Channel, and the common signal may be the Primary Common Pilot Channel.

Action 1403

This action corresponds to action 1105. The first wireless device 530 computes the first CQI based on the received first unique signal, and the third CQI based on the received second unique signal.

In some embodiments, the first wireless device 530 may further compute the second CQI based on the received common signal.

Action 1404

This action corresponds to action 1106. The first wireless device 530 sends the first CQI, and the third CQI to the central network node 513.

In some embodiments, the first wireless device 530 may further send the second CQI to the central network node 513.

Action 1405

This action corresponds to action 1110 and it is optional. The first wireless device 530 may receive the transmission from the one of the first network node 511 and the second network node 512 having the better channel quality to transmit to the first wireless device 530. In these embodiments, the one of the first network node 511 and the second network node 512 having a better channel quality is identified by the central network node 513 based on the sent first CQI and the sent third CQI.

In some embodiments, the one of the first network node 511 and the second network node 512 having a better channel quality is further identified by the central network node 513 based on the sent second CQI.

Embodiments of a method performed by a controller network node 514 of configuring a first wireless device 530, will now be described with reference to the flowchart depicted in FIG. 15. As stated earlier the first wireless device 530 operates in the combined cell deployment 501 in the wireless communications network 500, and the controller network node 514 operates in the wireless communications network 500.

Figure 15:
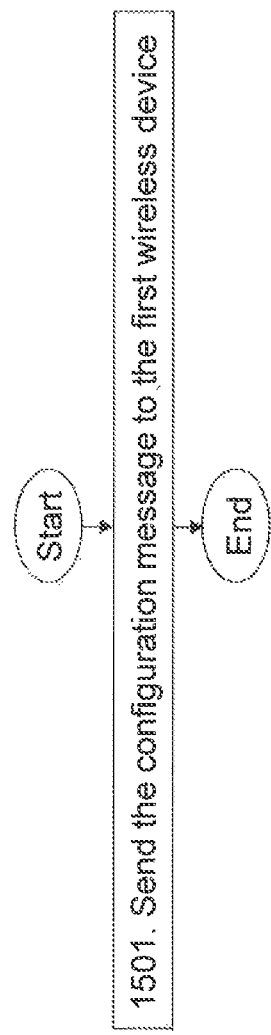
FIG. 15 is a schematic block diagram illustrating embodiments of a method in a controller network node, according to embodiments herein.

FIG. 15 depicts a flowchart of the actions that are or may be performed by the controller network node 514 in embodiments herein.

Further details on the actions described for the controller network node 514 may be found in the description of the corresponding action in FIG. 11, as indicated below. These further details are not repeated here for the sake of simplicity, but are equally applicable to the actions described in FIG. 15.

The method of instructing may comprise the following actions, which actions may as well be carried out in another suitable order than that described below. In some embodiments, all the actions may be carried out, whereas in other embodiments only some action/s may be carried out.

Action 1501

This action corresponds to action 1101. The controller network node 514 sends the configuration message to the first wireless device 530. The configuration message comprises instructions for the first wireless device 530 to compute the first CQI for the first unique channel, and to compute the third CQI for the second unique channel. The first CQI is to be computed by the first wireless device 530 based on the first unique signal transmitted by the first network node 511 operating in the combined cell deployment 501. The third CQI is to be computed by the first wireless device 530 based on a second unique signal transmitted by the second network node 512 operating in the combined cell deployment 501.

In some embodiments, the configuration message may comprise instructions for the first wireless device 530 to compute the second CQI for the first common channel. The second CQI is to be computed by the first wireless device 530 based on the common signal transmitted by the first network node 511 and the second network node 512.

To perform the method actions in the central network node 513 described above in relation to FIGS. 11 and 12 for handling channel quality in a heterogeneous network, the central network node 513 comprises the following arrangement depicted in FIG. 16, and as described below. As mentioned above, the central network node 513 is comprised in the wireless communications network 500.

The central network node 513 is configured to instruct the one of a first network node 511 and the second network node 512 to transmit to the first wireless device 530. The central network node 513, the first network node 511, the second network node 512, and the first wireless device 530 are configured to operate in the combined cell deployment 501 in the wireless communications network 500.

The central network node 513 is configured to receive the first CQI, and the third CQI sent by the first wireless device 530, wherein the first CQI has been computed by the first wireless device 530 based on the first unique signal transmitted by the first network node 511, and the third CQI has been computed by the first wireless device 530 based on the second unique signal transmitted by the second network node 512.

This may be implemented with a receiving circuit 1601 comprised in the central network node 513.

In some embodiments, to receive may further comprise to receive the second CQI sent by the first wireless device 530, wherein the second CQI has been computed by the first wireless device 530 based on a common signal transmitted by the first network node 511 and the second network node 512.

This may also be implemented by the receiving circuit 1601.

The central network node 513 is also configured to identify the one of the first network node 511 and the second network node 512 having the better channel quality to transmit to the first wireless device 530, based on the received first CQI and the third CQI.

This may be implemented with a circuit 1602 configured to identify comprised in the central network node 513.

In some embodiments, to identify may be further based on the received second CQI.

The central network node 513 is further configured to send the first message to the identified one of the first network node 511 and the second network node 512 having the better channel quality, the first message instructing the identified one of the first network node 511 and the second network node 512 to transmit to the first wireless device 530.

This may be implemented with a sending circuit 1603 comprised in the central network node 513.

In some embodiments, the central network node 513 may be further configured to send the second message to one of the first network node 511 and the second network node 512, which is not the network node identified as having the better channel quality, the second message instructing the one of the first network node 511 and the second network node 512 which is not the network node identified to transmit to another wireless device in the combined cell deployment 501, which is not the first wireless device 530.

This may also be implemented by the sending circuit 1603.

In some embodiments, each of the first unique signal and the third unique signal may be the Fractional Common Pilot Channel, and wherein the common signal is the Primary Common Pilot Channel.

Figure 16:
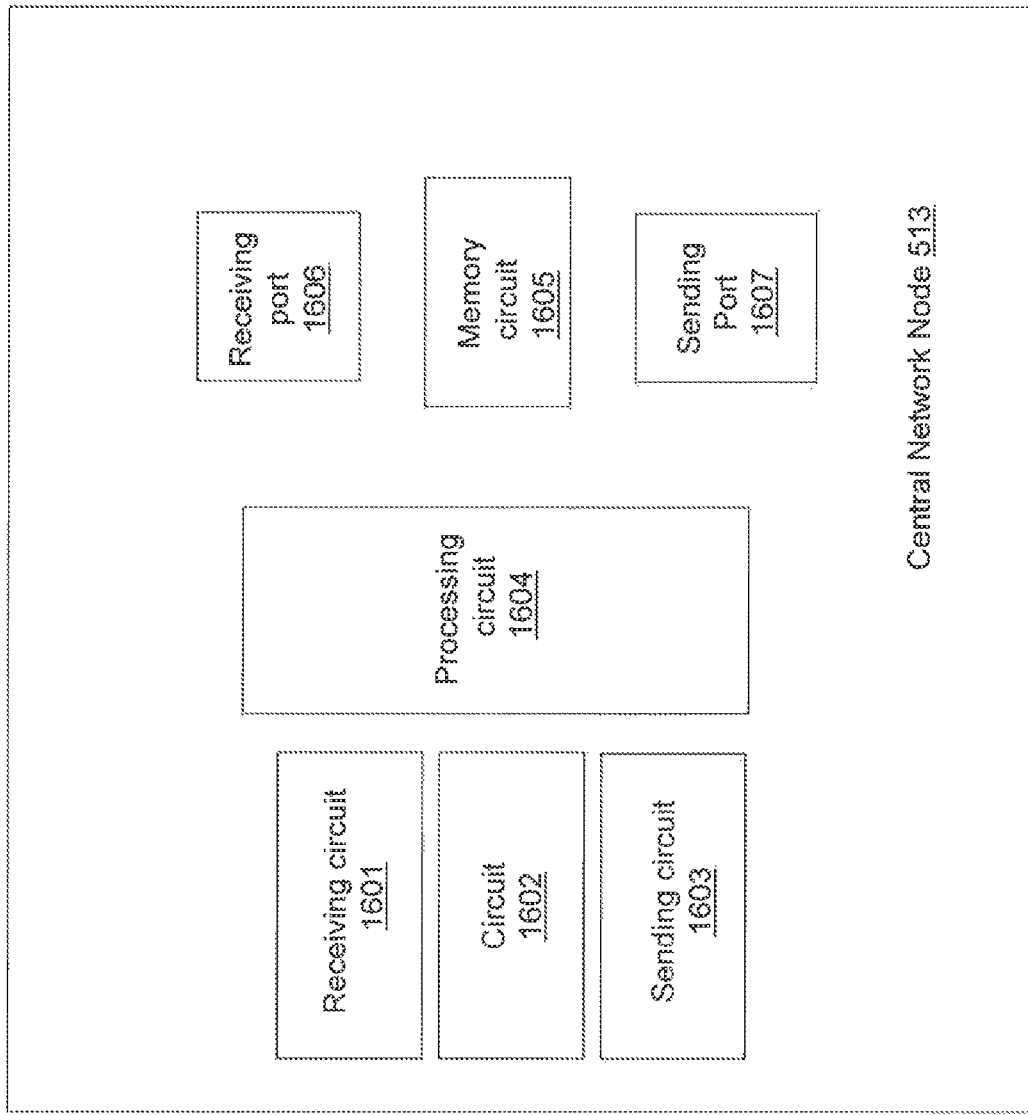
FIG. 16 is a schematic block diagram illustrating embodiments of a central network node.

The embodiments herein for handling channel quality in a heterogeneous network may be implemented through one or more processors, such as a processing circuit 1604 in the central network node 513 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the in the central network node 513. One such carrier may be in the form of a CD ROM disc. It may be however feasible with other data carriers such as a memory stick. The computer program code may furthermore be provided as pure program code on a server and downloaded to the central network node 513. As indicated above, the processing circuit 1604 may comprise one or more circuits, which may also be referred to as one or more modules in some embodiments, each configured to perform the actions carried out by the central network node 513, as described above in reference to FIGS. 11 and 12, e.g., the receiving circuit 1601, the sending circuit 1603, etc. . . . Hence, in some embodiments, the different circuits 1601-1603 described above may be implemented as one or more applications running on one or more processors such as the processing circuit 1604. That is, the methods according to the embodiments described herein for the central network node 513 are respectively implemented by means of a computer program product, comprising instructions, i.e., software code portions, which, when executed on at least one processor, cause the at least one processor to carry out the actions described herein, as performed by the central network node 513. The computer program product may be stored on a computer-readable storage medium. The computer-readable storage medium, having stored thereon the computer program, may comprise instructions which, when executed on at least one processor, cause the at least one processor to carry out the actions described herein, as performed by the central network node 513. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The central network node 513 may further comprise a memory circuit 1605 comprising one or more memory units. The memory circuit 1605 may be arranged to be used to store data such as, the information received by the processing circuit 1604, and applications to perform the methods herein when being executed in central network node 513. Memory circuit 1605 may be in communication with the processing circuit 1604. Any of the other information processed by the processing circuit 1604 may also be stored in the memory circuit 1605.

In some embodiments, information from the wireless device 530, and/or the first network node 511, and/or second network node 512, and/or the controller network node 514 may be received through a receiving port 1606. The receiving port 1606 may be in communication with the processing circuit 1604. The receiving port 1606 may also be configured to receive other information.

The processing circuit 1604 may be further configured to send messages to the wireless device 530 and/or the first network node 511, and/or the second network node 512, through a sending port 1607, which may be in communication with the processing circuit 1604, and the memory circuit 1605.

Those skilled in the art will also appreciate that the one or more circuits 1601-1603 comprised in the processing circuit 1604 described above may refer to a combination of analog and digital circuits, and/or one or more processors configured with software and/or firmware, e.g., stored in memory, that, when executed by the one or more processors such as the processing circuit 1604, perform actions as described above, in relation to FIGS. 11 and 12. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in the first network node 511 described above in relation to FIGS. 11 and 13 for handling channel quality in a heterogeneous network, the first network node 511 comprises the following arrangement depicted in FIG. 17, and as described below. As mentioned above, the first network node 511 is comprised in the wireless communications network 500.

The first network node 511 configured to transmit to the first wireless device 530. The first network node 511 and the first wireless device 530 are configured to operate in the combined cell deployment 501 in the wireless communications network 500.

The first network node 511 is configured to transmit the first unique signal to the first wireless device 530, wherein the first unique signal enables the first wireless device 530 to compute the first CQI, based on the first unique signal, and wherein the first CQI enables the central network node 513 configured to operate in the combined cell deployment 501 to identify the one of the first network node 511 and the second network node 512 configured to operate in the combined cell deployment 501 having the better channel quality to transmit to the first wireless device 530.

This may be implemented with a transmitting circuit 1701 comprised in the first network node 511.

In some embodiments, to transmit may further comprise to transmit the common signal to the first wireless device 530, wherein the common signal enables the first wireless device 530 to compute the second CQI, and wherein the second CQI further enables the central network node 513 to identify the one of the first network node and the second network node 512 having the better channel quality to transmit to the first wireless device 530.

This may also be implemented by the transmitting circuit 1701.

In some embodiments, the first network node 511 may be further configured to transmit to the first wireless device 530, based to the instruction received from the central network node 513.

This may also be implemented by the transmitting circuit 1701.

The first network node 511 is also configured to receive the first message from the central network node 513 instructing the first network node 511 to transmit to the first wireless device 530.

This may be implemented with a receiving circuit 1702 comprised in the first network node 511.

In some embodiments, the first unique signal may be the Fractional Common Pilot Channel, and wherein the common signal is the Primary Common Pilot Channel.

Figure 17:
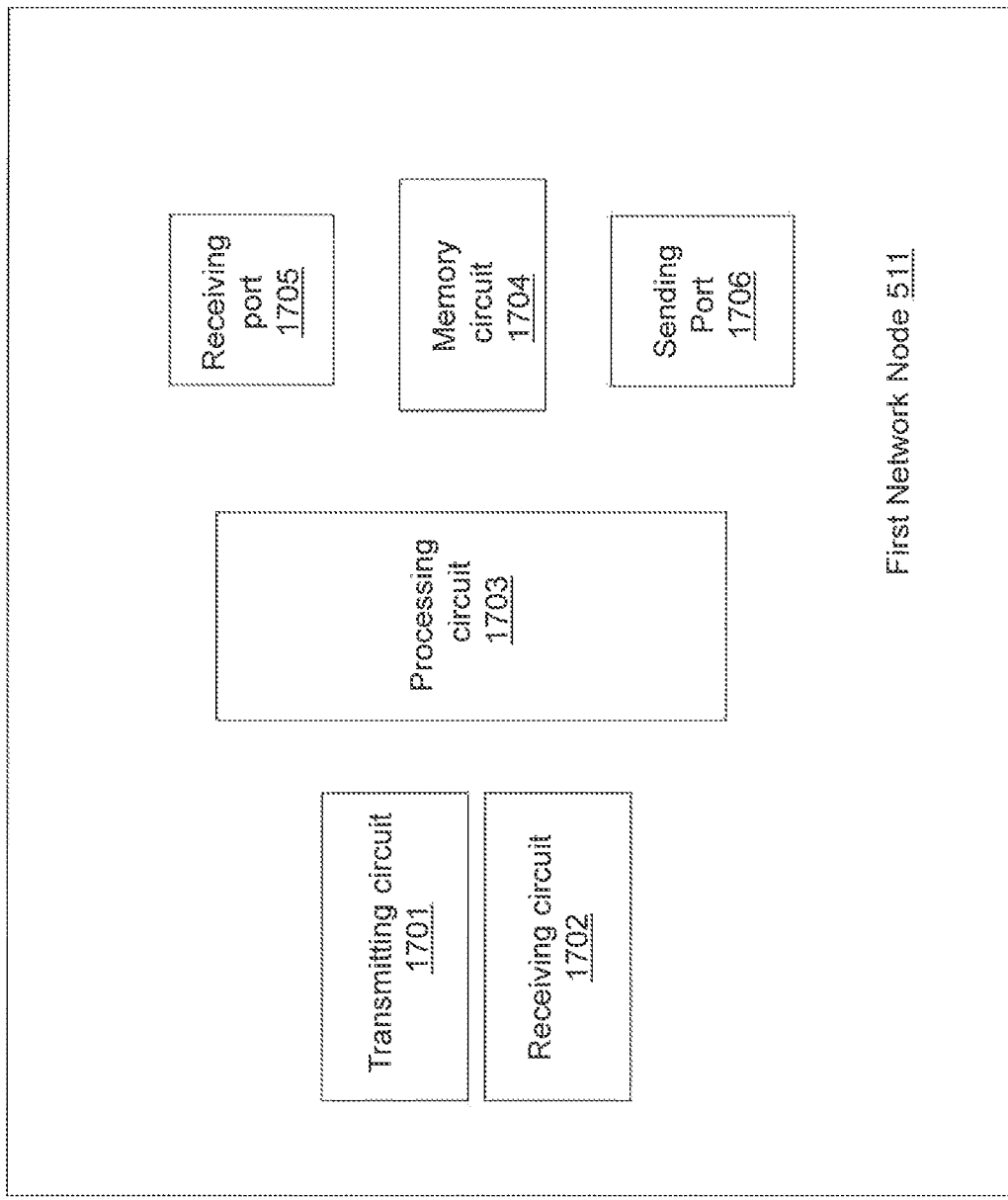
FIG. 17 is a schematic block diagram illustrating embodiments of a first network node.

The embodiments herein for handling channel quality in a heterogeneous network may be implemented through one or more processors, such as a processing circuit 1703 in the first network node 511 depicted in FIG. 17, together with computer program code for performing the functions and actions of the embodiments herein. The program code mentioned above may also be provided as a computer program product, for instance in the form of a data carrier carrying computer program code for performing the embodiments herein when being loaded into the in the first network node 511. One such carrier may be in the form of a CD ROM disc. It may be however feasible with other data carriers such as a memory stick. The computer program code may furthermore be provided as pure program code on a server and downloaded to the first network node 511. As indicated above, the processing circuit 1703 may comprise one or more circuits, which may also be referred to as one or more modules in some embodiments, each configured to perform the actions carried out by the first network node 511, as described above in reference to FIGS. 11 and 13, e.g., transmitting circuit 1701, the receiving circuit 1702, etc. . . . Hence, in some embodiments, the different circuits 1701-1702 described above may be implemented as one or more applications running on one or more processors such as the processing circuit 1703. That is, the methods according to the embodiments described herein for the first network node 511 are respectively implemented by means of a computer program product, comprising instructions, i.e., software code portions, which, when executed on at least one processor, cause the at least one processor to carry out the actions described herein, as performed by the first network node 511. The computer program product may be stored on a computer-readable storage medium. The computer-readable storage medium, having stored thereon the computer program, may comprise instructions which, when executed on at least one processor, cause the at least one processor to carry out the actions described herein, as performed by the first network node 511. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The first network node 511 may further comprise a memory circuit 1704 comprising one or more memory units. The memory circuit 1704 may be arranged to be used to store data such as, the information received by the processing circuit 1703, and applications to perform the methods herein when being executed in the primary network node 511. Memory circuit 1704 may be in communication with the processing circuit 1703. Any of the other information processed by the processing circuit 1703 may also be stored in the memory circuit 1704.

In some embodiments, information from the wireless device 530, and/or the central network node 513 may be received through a receiving port 1705. The receiving port 1705 may be in communication with the processing circuit 1703. The receiving port 1705 may also be configured to receive other information.

The processing circuit 1703 may be further configured to send messages to the wireless device 530 and/or the central network node 513 through a sending port 1706, which may be in communication with the processing circuit 1703, and the memory circuit 1704.

Those skilled in the art will also appreciate that the one or more circuits 1701-1702 comprised in the processing circuit 1703 described above may refer to a combination of analog and digital circuits, and/or one or more processors configured with software and/or firmware (e.g., stored in memory) that, when executed by the one or more processors such as the processing circuit 1703, perform actions as described above, in relation to FIGS. 11 and 13. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in the second network node 512 described above in relation to FIG. 11 for handling channel quality in a heterogeneous network, the second network node 512 comprises a similar arrangement to that depicted in FIG. 17, and will therefore not be repeated here.

To perform the method actions in the wireless device 530 described above in relation to FIGS. 11 and 14 for handling channel quality in a heterogeneous network, the wireless device 530 comprises the following arrangement depicted in FIG. 18, and as described below. As mentioned above, the wireless device 530 is comprised in the wireless communications network 500.

The first wireless device 530 is configured to send CQIs to the central network node 513. The central network node 513 and the first wireless device 530 are configured to operate in the combined cell deployment 501 in the wireless communications network 500.

The first wireless device 530 is configured to receive the first unique signal from the first network node 511 configured to operate in the combined cell deployment 501, and the second unique signal from the second network node 512 configured to operate in the combined cell deployment 501.

This may be implemented with a receiving circuit 1801 comprised in the first wireless device 530.

In some embodiments, the first wireless device 530 may be further configured to receive the common signal from the first network node 511 and the second network node 512.

This may also be implemented by the receiving circuit 1801.

In some embodiments, the first wireless device 530 may be further configured to receive the transmission from the one of the first network node 511 and the second network node 512 having the better channel quality to transmit to the first wireless device 530, the one of the first network node 511 and the second network node 512 having the better channel quality being identified by the central network node 513 based on the sent first CQI, and the sent third CQI.

This may also be implemented by the receiving circuit 1801.

In some embodiments, the one of the first network node 511 and the second network node 512 having the better channel quality may be further identified by the central network node 513 based on the sent second CQI.

In some embodiments, the first wireless device 530 may be further configured to receive the configuration message from the controller network node 514 being configured to operate in the wireless communications network 500, the configuration message comprising instructions for the first wireless device 530 to compute the first CQI, and the third CQI.

This may also be implemented by the receiving circuit 1801.

In some embodiments, the configuration message from the controller network node 514 may further comprise instructions for the first wireless device 530 to compute the second CQI.

The first wireless device 530 is configured to compute the first CQI based on the received first unique signal, and the third CQI based on the received second unique signal.

This may be implemented with a computing circuit 1802 comprised in the first wireless device 530.

In some embodiments, the first wireless device 530 may be further configured to compute the second CQI based on the received common signal.

This may also be implemented by the computing circuit 1802.

The first wireless device 530 is also configured to send the first CQI, and the third CQI to the central network node 513.

This may be implemented with a sending circuit 1803 comprised in the first wireless device 530.

In some embodiments, the first wireless device 530 may be further configured to send second CQI to the central network node 513.

This may also be implemented by the sending circuit 1803.

In some embodiments, each of the first unique signal and the third unique signals is the Fractional Common Pilot Channel, and the common signal is the Primary Common Pilot Channel.

Figure 18:
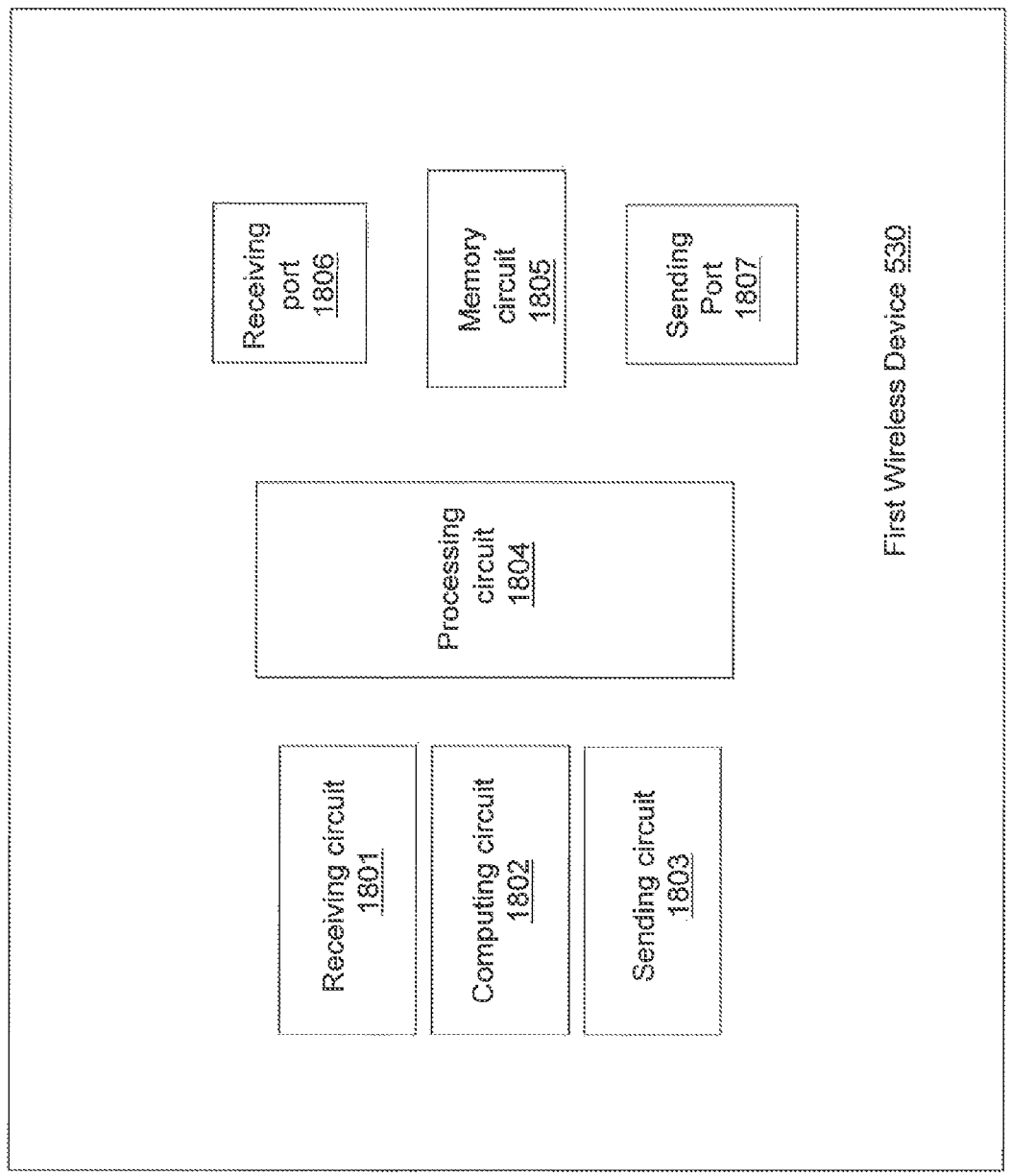
FIG. 18 is a schematic block diagram illustrating embodiments of a first wireless device.

The embodiments herein for handling channel quality in a heterogeneous network may be implemented through one or more processors, such as a processing circuit 1804 in the wireless device 530 depicted in FIG. 18, together with computer program code for performing the functions and actions of the embodiments herein. The program code mentioned above may also be provided as a computer program product, for instance in the form of a data carrier carrying computer program code for performing the embodiments herein when being loaded into the in the wireless device 530. One such carrier may be in the form of a CD ROM disc. It may be however feasible with other data carriers such as a memory stick. The computer program code may furthermore be provided as pure program code on a server and downloaded to the wireless device 530. As indicated above, the processing circuit 1804 may comprise one or more circuits, which may also be referred to as one or more modules in some embodiments, each configured to perform the actions carried out by the wireless device 530, as described above in reference to FIGS. 11 and 14, e.g., the receiving circuit 1801, the computing circuit 1802, the sending circuit 1803, a, etc. . . . Hence, in some embodiments, the different circuits 1801-1803 described above may be implemented as one or more applications running on one or more processors such as the processing circuit 1804. That is, the methods according to the embodiments described herein for the first wireless device 530 are respectively implemented by means of a computer program product, comprising instructions, i.e., software code portions, which, when executed on at least one processor, cause the at least one processor to carry out the actions described herein, as performed by the first wireless device 530. The computer program product may be stored on a computer-readable storage medium. The computer-readable storage medium, having stored thereon the computer program, may comprise instructions which, when executed on at least one processor, cause the at least one processor to carry out the actions described herein, as performed by the first wireless device 530. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The wireless device 530 may further comprise a memory circuit 1805 comprising one or more memory units. The memory circuit 1805 may be arranged to be used to store data such as, the information received by the processing circuit 1804, and applications to perform the methods herein when being executed in wireless device 530. Memory circuit 1805 may be in communication with the processing circuit 1804. Any of the other information processed by the processing circuit 1804 may also be stored in the memory circuit 1805.

In some embodiments, information from the central network node 513, and/or the first network node 511, and/or second network node 512 may be received through a receiving port 1806. The receiving port 1806 may be in communication with the processing circuit 1804. The receiving port 1806 may also be configured to receive other information.

The processing circuit 1804 may be further configured to send messages to the first network node 511 and/or the network node 512, through a sending port 1807, which may be in communication with the processing circuit 1804, and the memory circuit 1805.

Those skilled in the art will also appreciate that the one or more circuits 1801-1803 comprised in the processing circuit 1804 described above may refer to a combination of analog and digital circuits, and/or one or more processors configured with software and/or firmware, e.g., stored in memory, that, when executed by the one or more processors such as the processing circuit 1804, perform actions as described above, in relation to FIGS. 11 and 14. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

To perform the method actions in the controller network node 514 described above in relation to FIGS. 11 and 15 for handling channel quality in a heterogeneous network, the controller network node 514 comprises the following arrangement depicted in FIG. 19, and as described below. As mentioned above, the controller network node 514 is comprised in the wireless communications network 500.

The controller network node 514 is configured to send the message to the first wireless device 530. The first wireless device 530 is configured to operate in the combined cell deployment 501 in the wireless communications network 500. The controller network node 514 is configured to operate in the wireless communications network 500.

The controller network node 514 is configured to send the configuration message to the first wireless device 530, the configuration message comprising instructions for the first wireless device 530 to compute the first CQI, for the first unique channel, and to compute the third CQI for the second unique channel, wherein the first CQI is to be computed by the first wireless device 530 based on the first unique signal transmitted by the first network node 511 configured to operate in the combined cell deployment 501, and the third CQI is to be computed by the first wireless device 530 based on the second unique signal transmitted by the second network node 512 configured to operate in the combined cell deployment 501.

This may be implemented with a sending circuit 1901 comprised in the controller network node 514.

In some embodiments, the configuration message may further comprise instructions for the first wireless device 530 to compute the second CQI for the first common channel, wherein the second CQI is to be computed by the first wireless device 530 based on the common signal transmitted by the first network node 511 and the second network node 512.

Figure 19:
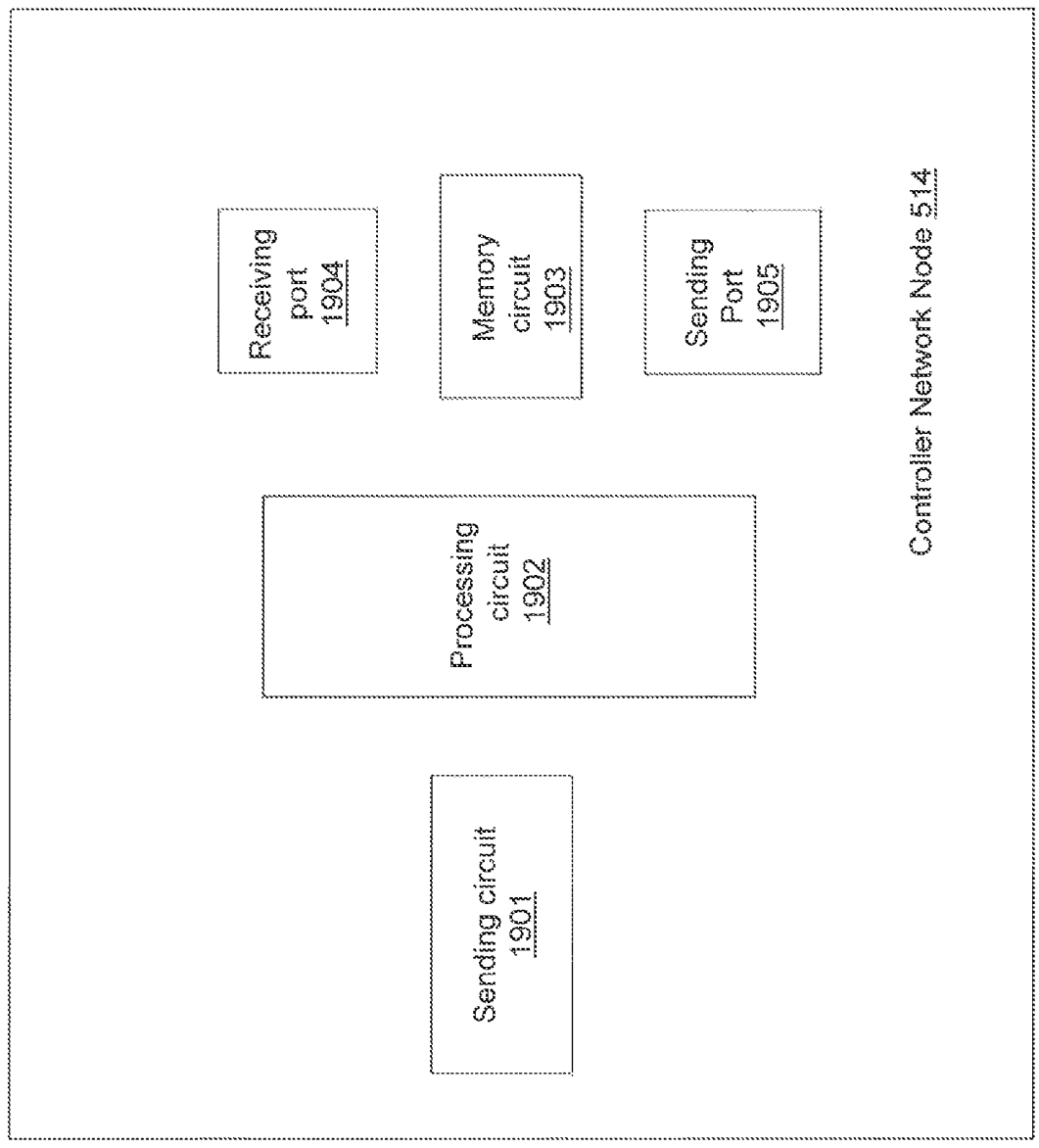
FIG. 19 is a schematic black diagram illustrating embodiments of a controller network node.

The embodiments herein for handling channel quality in a heterogeneous network may be implemented through one or more processors, such as a processing circuit 1902 in the controller network node 514 depicted in FIG. 19, together with computer program code for performing the functions and actions of the embodiments herein. The program code mentioned above may also be provided as a computer program product, for instance in the form of a data carrier carrying computer program code for performing the embodiments herein when being loaded into the in the controller network node 514. One such carrier may be in the form of a CD ROM disc. It may be however feasible with other data carriers such as a memory stick. The computer program code may furthermore be provided as pure program code on a server and downloaded to the controller network node 514. As indicated above, the processing circuit 1902 may comprise one or more circuits, which may also be referred to as one or more modules in some embodiments, each configured to perform the actions carried out by the controller network node 514, as described above in reference to FIGS. 11 and 15, e.g., a receiving circuit, a sending circuit, a configuring circuit, etc. . . . Hence, in some embodiments, the different circuits 1901 described above may be implemented as one or more applications running on one or more processors such as the processing circuit 1902. That is, the methods according to the embodiments described herein for the controller network node 514 are respectively implemented by means of a computer program product, comprising instructions, i.e., software code portions, which, when executed on at least one processor, cause the at least one processor to carry out the actions described herein, as performed by the controller network node 514. The computer program product may be stored on a computer-readable storage medium. The computer-readable storage medium, having stored thereon the computer program, may comprise instructions which, when executed on at least one processor, cause the at least one processor to carry out the actions described herein, as performed by the controller network node 514. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The controller network node 514 may further comprise a memory circuit 1903 comprising one or more memory units. The memory circuit 1903 may be arranged to be used to store data such as, the information received by the processing circuit 1902, and applications to perform the methods herein when being executed in controller network node 514. Memory circuit 1903 may be in communication with the processing circuit 1902. Any of the other information processed by the processing circuit 1902 may also be stored in the memory circuit 1903.

In some embodiments, information from the central network node 513 may be received through a receiving port 1904. The receiving port 1904 may be in communication with the processing circuit 1902. The receiving port 1904 may also be configured to receive other information.

The processing circuit 1902 may be further configured to send messages to the central network node 513 through a sending port 1905, which may be in communication with the processing circuit 1902, and the memory circuit 1903.

Those skilled in the art will also appreciate that the one or more circuits comprised in the processing circuit 1902 described above may refer to a combination of analog and digital circuits, and/or one or more processors configured with software and/or firmware, e.g., stored in memory, that, when executed by the one or more processors such as the processing circuit 1902, perform actions as described above, in relation to FIGS. 11 and 15. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

Modifications and other variants of the described embodiments will come to mind to one skilled in the art having the benefit of the teachings presented in the foregoing descriptions and the associated drawings. Therefore, it is to be understood, that the embodiments are not to be limited to the specific examples disclosed and that modifications and other variants are intended to be included within the scope of this disclosure. Although specific terms may be employed herein, they are used in a generic and descriptive sense only and not for purposes of limitation.

ABBREVIATIONS

Tx Transmitter
HSDPA High Speed Downlink Packet Access
HS-SCCH High speed shared control channel
HS-PDSCH High speed Physical data shared channel
HARQ Hybrid automatic repeat request
CRC Cyclic redundancy check
NAK non-acknowledgement
ACK acknowledgement
CC Chase combining
IR Incremental Redundancy
UE User Equipment
CQI Channel quality information
MMSE Minimum Mean Square Error
TTI Transmit Time Interval
PCI Precoding control index
P-CPICH Primary Common Pilot Channel
D-CPICH Demodulation (dedicated) Common Pilot Channel.
LPN Low Power Node
HS-DPCCH High Speed dedicated physical common control channel
DL Downlink
SIMO Single input multiple output

The invention claimed is:

1. A method performed by a central network node of instructing one of a first network node and a second network node to transmit to a first wireless device, the central network node, the first network node, the second network node, and the first wireless device operating in a combined cell deployment in a wireless communications network, the method comprising:
  receiving a first Channel Quality Indicator (CQI), a second CQI, and a third CQI sent by the first wireless device, wherein the first CQI has been computed by the first wireless device based on a first unique signal transmitted by the first network node, wherein the second CQI has been computed by the first wireless device based on a common signal transmitted by the first network node and the second network node, and wherein the third CQI has been computed by the first wireless device based on a second unique signal transmitted by the second network node, the first network node and the second network node being associated with a single cell in the combined cell deployment and a same cell id,
  identifying the one of the first network node and the second network node having a better channel quality to transmit to the first wireless device, based on the received first CQI, the second CQI, and the third CQI,
  scheduling a transmission to the first wireless device, the scheduling comprising selecting for the transmission the identified one of the first network node and the second network node having the better channel quality, and
  sending a first message to the identified one of the first network node and the second network node having the better channel quality, the first message instructing the identified one of the first network node and the second network node to transmit the transmission to the first wireless device.

2. The method of claim 1, wherein each of the first unique signal and the third unique signal is a Fractional Common Pilot Channel, and wherein the common signal is a Primary Common Pilot Channel.

3. A non-transitory computer-readable storage medium, having stored thereon a computer program, comprising instructions which, when executed on at least one processor, cause the at least one processor to carry out the method according to claim 1.

4. A method performed by a first network node of transmitting to a first wireless device, the first network node and the first wireless device operating in a combined cell deployment in a wireless communications network, the method comprising:
  transmitting a first unique signal to the first wireless device,
    wherein the first unique signal enables the first wireless device to compute a first Channel Quality Indicator (CQI) based on the first unique signal,
    wherein the first CQI enables a central network node operating in the combined cell deployment to identify one of the first network node and a second network node operating in the combined cell deployment having a better channel quality and to schedule a data transmission to the first wireless device, the scheduling comprising selecting for the transmission the identified one of the first network node and the second network node having the better channel quality to transmit to the first wireless device, the first network node and the second network node being associated with a single cell in the combined cell deployment and a same cell id; and
  transmitting a common signal to the first wireless device,
    wherein the common signal enables the first wireless device to compute a second CQI, and
    wherein the second CQI further enables the central network node to identify the one of the first network node and the second network node having the better channel quality to transmit to the first wireless device; and
  receiving a first message from the central network node instructing the first network node to transmit the transmission to the first wireless device.

5. The method of claim 4, wherein the first unique signal is a Fractional Common Pilot Channel, and wherein the common signal is a Primary Common Pilot Channel.

6. A non-transitory computer-readable storage medium, having stored thereon a computer program, comprising instructions which, when executed on at least one processor, cause the at least one processor to carry out the method according to claim 4.

7. A method performed by a first wireless device of sending Channel Quality Indicators (CQIs) to a central network node, the central network node and the first wireless device operating in a combined cell deployment in a wireless communications network, the method comprising:
  receiving a first unique signal from a first network node operating in the combined cell deployment, a second unique signal from a second network node operating in the combined cell deployment, and a common signal from the first network node and the second network node, wherein the first network node and the second network node are associated with a single cell in the combined cell deployment and a same cell id, computing a first CQI based on the received first unique signal, a second CQI based on the received common signal, and a third CQI based on the received second unique signal, and sending the first CQI, the second CQI, and the third CQI to the central network node for the scheduling by the central network node of a data transmission to wireless device, the scheduling comprising selecting for the transmission the one of a first network node and a second network node having the better channel quality, identified by CQI reported by the wireless devices.

8. The method of claim 7, further comprising receiving a transmission from the one of the first network node and the second network node having a better channel quality to transmit to the first wireless device, the one of the first network node and the second network node having a better channel quality being identified by the central network node based on the sent first CQI, the sent second CQI, and the sent third CQI.

9. The method of claim 7, wherein each of the first unique signal and the third unique signals is a Fractional Common Pilot Channel, and the common signal is a Primary Common Pilot Channel.

10. A non-transitory computer-readable storage medium, having stored thereon a computer program, comprising instructions which, when executed on at least one processor, cause the at least one processor to carry out the method according to claim 7.

11. A central network node configured to instruct one of a first network node and a second network node to transmit to a first wireless device, the central network node, the first network node, the second network node, and the first wireless device being configured to operate in a combined cell deployment in a wireless communications network, the central network node comprising:
 a receiving port configured to receive a first Channel Quality Indicator (CQI), a second CQI, and a third CQI sent by the first wireless device, wherein the first CQI has been computed by the first wireless device based on a first unique signal transmitted by the first network node, wherein the second CQI has been computed by the first wireless device based on a common signal transmitted by the first network node and the second network node, and wherein the third CQI has been computed by the first wireless device based on a second unique signal transmitted by the second network node, the first network node and the second network node being associated with a single cell in the combined cell deployment and a same cell id, and
 at least one processor in communication with the receiving port, the at least one processor configured to:
  identify the one of the first network node and the second network node having the better channel quality and schedule data transmission to the first wireless device; the scheduling comprising selecting for the transmission the identified one of the first network node and the second network node having the better channel quality to transmit to the first wireless device, based on the received first CQI, the second CQI, and the third CQI, and
  send a first message to the identified one of the first network node and the second network node having the better channel quality, the first message instructing the identified one of the first network node and the second network node to transmit to the first wireless device.

12. The central network node of claim 11, wherein each of the first unique signal and the third unique signal is a Fractional Common Pilot Channel, and wherein the common signal is a Primary Common Pilot Channel.

13. A first network node configured to transmit to a first wireless device, the first network node and the first wireless device being configured to operate in a combined cell deployment in a wireless communications network, the first network node comprising:
 at least one processor configured to generate a first unique signal;
 a sending port in communication with the processor, the sending port configured to:
  transmit the first unique signal to the first wireless device,
  transmit a common signal to the first wireless device, wherein the first unique signal enables the first wireless device to compute a first Channel Quality Indicator (CQI) based on the first unique signal,
  wherein the common signal enables the first wireless device to compute a second CQI, and
  wherein the first CQI and the second CQI enables a central network node configured to operate in the combined cell deployment to identify the one of the first network node and a second network node having the better channel quality to transmit to the first wireless device, wherein the first network node and the second network node are associated with a single cell and a same cell id and are configured to operate in the combined cell deployment, wherein the central node selects for the transmission the identified one of the first network node and the second network node having the better channel quality to transmit to the first wireless device; and
 a receiving port in communication with the processor, the receiving port configured to receive a first message from the central network node instructing the first network node to transmit the transmission to the first wireless device.

14. The first network node of claim 13, wherein the first unique signal is a Fractional Common Pilot Channel, and wherein the common signal is a Primary Common Pilot Channel.

15. A first wireless device configured to send Channel Quality Indicators (CQIs) to a central network node, the central network node and the first wireless device being configured to operate in a combined cell deployment in a wireless communications network, the first wireless device comprising:
 a receiving port configured to:
  receive a first unique signal from a first network node configured to operate in the combined cell deployment,
  receive a second unique signal from a second network node configured to operate in the combined cell deployment, and
  receive a common signal from the first network node and the second network node,
 at least one processor in communication with the receiving port, the processor configured to compute a first CQI based on the received first unique signal, a second CQI based on the received common signal, and a third CQI based on the received second unique signal, and a sending port configured to send the first CQI, the second CQI, and the third CQI to the central network node, wherein the first CQI, the second CQI, and the third CQI enable the central network node to identify one of the first network node and the second network node having the better channel quality and to schedule a data transmission to the first wireless device, the scheduling comprising selecting for the transmission the identified one of the first network node and the second network node having the better channel quality, the first network node and the second network node being associated with a single cell in the combined cell deployment and a same cell id.

16. The first wireless device of claim 15, wherein:

the receiving port is further configured to receive a transmission from the one of the first network node and the second network node having a better channel quality to transmit to the first wireless device, the one of the first network node and the second network node having a better channel quality being identified by the central network node based on the sent first CQI, the second CQI, and the sent third CQI.

17. The first wireless device of claim 15, wherein each of the first unique signal and the third unique signals is a Fractional Common Pilot Channel, and the common signal is a Primary Common Pilot Channel.

* * * * *